(12) United States Patent
Muratsubaki et al.

(10) Patent No.: US 8,134,098 B2
(45) Date of Patent: Mar. 13, 2012

(54) LASER MACHINING APPARATUS USING LASER BEAM INTRODUCED INTO JET LIQUID COLUMN

(75) Inventors: Ryoji Muratsubaki, Kurobe (JP); Yukiaki Nagata, Uozu (JP); Tadashi Sugimori, Kurobe (JP)

(73) Assignee: Sugino Machine Limited, Uozu-shi (JP)

( * ) Notice: Subject to any disclaimer, the term of this patent is extended or adjusted under 35 U.S.C. 154(b) by 730 days.

(21) Appl. No.: 12/232,378

(22) Filed: Sep. 16, 2008

(65) Prior Publication Data

US 2009/0084765 A1   Apr. 2, 2009

(30) Foreign Application Priority Data

Sep. 28, 2007 (JP) ................................. 2007-254318
Feb. 18, 2008 (JP) ................................. 2008-036507

(51) Int. Cl.
*B23K 26/14* (2006.01)

(52) U.S. Cl. .......... 219/121.67; 219/121.84; 219/121.68

(58) Field of Classification Search ............. 219/121.67, 219/121.84, 121.68, 121.7, 121.6
See application file for complete search history.

(56) References Cited

U.S. PATENT DOCUMENTS

| | | | | |
|---|---|---|---|---|
| 4,987,286 A | * | 1/1991 | Allen | 219/121.68 |
| 5,773,791 A | * | 6/1998 | Kuykendal | 219/121.84 |
| 5,902,499 A | * | 5/1999 | Richerzhagen | 219/121.84 |
| 7,919,727 B2 | * | 4/2011 | Nishiya et al. | 219/121.84 |

FOREIGN PATENT DOCUMENTS

| | | |
|---|---|---|
| JP | A-10-500903 | 1/1998 |
| WO | WO 2005121762 A1 * | 12/2005 |

* cited by examiner

*Primary Examiner* — M. Alexandra Elve
(74) *Attorney, Agent, or Firm* — Oliff & Berridge, PLC

(57) ABSTRACT

A laser machining apparatus comprises a nozzle for ejecting a jet liquid to a workpiece and a liquid supply unit for supplying the jet liquid to the nozzle, while a laser beam is introduced into a jet liquid column ejected from the nozzle. The laser machining apparatus further comprises a laminar flow forming channel for supplying the jet liquid to the nozzle in a laminar state. The laminar flow forming channel includes a distribution channel formed by a cavity for annually distributing the jet liquid, which is supplied from the liquid supply unit, around an axis of the nozzle, an interconnecting channel disposed to be communicated with the distribution channel at the downstream side thereof in an axial direction of the nozzle and formed by an annular cavity around the axis of the nozzle to provide a narrower flow passage than the distribution channel, and a liquid reservoir chamber adjacently disposed upstream of the nozzle in the axial direction thereof and storing the jet liquid to be supplied to the nozzle. The liquid reservoir chamber has an outer peripheral edge being communicated with the interconnecting channel over an entire circumference of the annular shape thereof.

9 Claims, 18 Drawing Sheets

LASER MACHINING APPARATUS USING LASER BEAM INTRODUCED INTO JET LIQUID COLUMN

BACKGROUND OF THE INVENTION

1. Field of the Invention

The present invention relates to a laser machining (processing) apparatus using a laser beam introduced into a jet liquid column. More particularly, the present invention relates to a laser machining apparatus using a laser beam introduced into a jet liquid column, which apparatus can improve propagation efficiency of the laser beam and can ensure stable machining quality.

2. Description of the Related Art

Hitherto, there is known an apparatus for irradiating a laser beam into a jet liquid column of an electrolyte for plating or etching, and performing the plating or the etching on a substrate by utilizing a technique of introducing the laser beam through the jet liquid column. There is also known a therapy apparatus for incising a to-be-treated part with a water jet and a laser beam by irradiating the laser beam into the water jet and propagating the laser beam in the water jet with total reflection.

Such a technique of introducing the laser beam in the liquid column with total reflection is applied to various fields. In the laser machining field, a laser machining apparatus is known in which desired laser machining is performed by irradiating a laser beam at the same time as when a liquid is jetted (e.g., PCT Japanese Translation Patent Application Publication No. Hei 10-500903 (Patent Document 1), FIG. 2). In the known laser machining apparatus, a nozzle block having a nozzle passage formed therein to jet a liquid column beam (jet liquid column) is disposed at a distal end of a machining head, and a laser beam is condensed by a focusing lens to an inlet opening of the nozzle passage so that the laser beam is introduced into the liquid column beam jetted out of the nozzle passage.

Further, a YAG laser (with a wavelength of 1064 nm), a $CO_2$ laser (with a wavelength of 10.6 µm), etc. have hitherto been primarily used to provide laser beams in the known laser machining apparatuses.

Because the YAG laser (with a wavelength of 1064 nm) and the $CO_2$ laser (with a wavelength of 10.6 µm) are more easily absorbable by water that is usually employed to produce a jet liquid column, the propagation efficiency of the laser beam is low. In addition, because thermal lens action is induced by heating generated when the laser beam is absorbed by the water, a difficulty is caused in efficiently introducing the laser beam to the water jet (jet liquid column). Further, if the laser beam is refracted by the induced thermal lens action, the refracted laser beam may strike against an inlet opening portion of a nozzle, thus damaging the nozzle.

To solve the above-described problem, in the laser machining apparatus described in Patent Document 1, the height of a liquid supply space, which serves as a water feed passage for introducing water to the nozzle for ejecting the water jet, is lowered to shorten a distance through which the laser beam intersects the water feed passage. Also, in that apparatus, a flow speed of the water flowing through the liquid supply space is increased by lowering the height of the liquid supply space. This is effective in reducing a temperature rise of the water that flows through the liquid supply space and absorbs the laser beam, and in suppressing the formation of a thermal lens.

However, when the flow speed of the water in the liquid supply space for introducing the water to the nozzle is increased to reduce the temperature rise of the water, another problem arises in that the shape of the water jet becomes apt to fluctuate and the surface of the water jet is disturbed. More specifically, if the surface of the water jet is disturbed, the laser beam introduced with the water jet is also affected, thus resulting in deterioration in machining quality of the laser machining apparatus. In some cases, a very long time is necessary for one cycle of machining performed by the laser machining apparatus depending on the material or dimensions of a machining target. For that reason, the water jet is required to have high stability free from disturbances during the entire long machining time. Further, if the surface of the water jet is disturbed, the laser beam may run out of the water jet without being totally reflected at the surface of the water jet. Thus, the propagation efficiency of the laser beam is reduced due to the disturbances o the water jet.

SUMMARY OF THE INVENTION

In view of the above-described state of the art, an object of the present invention is to provide a laser machining apparatus which can stably generate a water jet for introducing a laser beam.

Another object of the present invention is to provide a laser machining apparatus using a laser beam introduced into a jet liquid column, which apparatus can improve propagation efficiency of the laser beam and can ensure stable machining quality.

To achieve the above objects, claim 1 of the present invention provides a laser machining apparatus comprising a laser oscillator for generating a laser beam, a nozzle for ejecting a jet liquid to a workpiece, and liquid supply means for supplying the jet liquid to the nozzle, the laser beam being introduced into a jet liquid column ejected from the nozzle, the laser machining apparatus further comprising a laminar flow forming channel for supplying the jet liquid to the nozzle in a laminar state, the laminar flow forming channel including a distribution channel formed by a cavity for annularly distributing the jet liquid, which is supplied from the liquid supply means, around an axis of the nozzle, an interconnecting channel disposed to be communicated with the distribution channel at the downstream side thereof in an axial direction of the nozzle and formed by an annular cavity around the axis of the nozzle to provide a narrower flow passage than the distribution channel, and a liquid reservoir chamber adjacently disposed upstream of the nozzle in the axial direction thereof and storing the jet liquid to be supplied to the nozzle, the liquid reservoir chamber having an outer peripheral edge being communicated with the interconnecting channel over an entire circumference of the annular shape thereof.

With the invention according to claim 1, the laminar flow forming channel for supplying the jet liquid to the nozzle in the laminar state is provided such that a flow in a stable laminar state (i.e., a state having a small Reynolds number) can be produced upstream of the nozzle. Therefore, the jet liquid column being less susceptible to disturbances at the surface thereof and being free from fluctuations can be ejected from the nozzle.

More specifically, the jet liquid supplied under a high pressure is first annularly distributed by the distribution channel around the nozzle axis. Then, the jet liquid flows through the interconnecting channel which is formed in the annular shape and provides the narrower flow passage than the distribution channel, so that the jet liquid is introduced to the liquid reservoir chamber in a state where turbulent flows are suppressed. A flow of the jet liquid introduced to the liquid reservoir chamber is reduced in its speed therein. As a result, the Reynolds number of the flow of the jet liquid is reduced and hence the jet liquid is introduced to the nozzle in the laminar state.

Further, since the outer peripheral edge of the liquid reservoir chamber is communicated with the interconnecting channel over the entire circumference of the annular shape thereof, the flow speed of the jet liquid is reduced while the jet liquid is uniformly introduced to the outer peripheral edge of the liquid reservoir chamber from the entire circumference of the interconnecting channel. As a result, the jet liquid can be maintained in the liquid reservoir chamber in the stable laminar state.

Thus, by providing the laminar flow forming channel that serves to reduce the flow speed upstream of the nozzle and to produce the stable laminar state, a stable jet liquid column being less susceptible to disturbances at the surface thereof and being free from fluctuations can be ejected from the nozzle, whereby deterioration of machining quality can be prevented. In addition, the propagation efficiency of the laser beam introduced into the jet liquid column can be increased.

According to claim 2 of the present invention, in the laser machining apparatus according to claim 1, the laser beam has an absorption coefficient of 0.01 [$cm^{-1}$] or less when the laser beam passes through the jet liquid.

According to claim 3 of the present invention, in the laser machining apparatus according to claim 2, the jet liquid is water and the laser beam is a green laser or a UV laser.

With those features, since attenuation of the laser beam can be reduced when the laser beam passes through the jet liquid, the laser beam can be introduced into the jet liquid column at sufficient intensity even when the liquid reservoir chamber is constructed to have a larger thickness (depth). Also, when the jet liquid is water, the propagation efficiency of the laser beam can be increased by using, as the laser beam, a green laser [second harmonic generation (SHG) YAG laser with a wavelength of 532 nm] or a UV laser (with a wavelength of, e.g., 355 nm or 266 nm), both the lasers being less absorbable by water and having a high transmissivity through water. Further, by using the laser beam that is less absorbable by the jet liquid, the formation of a heat lens is suppressed and the laser beam can be more easily introduced to an inlet opening of the nozzle with higher accuracy. Hence, the nozzle can be prevented from being damaged, and stable machining quality can be ensured.

According to claim 4 of the present invention, in the laser machining apparatus according to any one of claims 1 to 3, the jet liquid is water and the laser beam has a wavelength range of 200 to 700 nm.

With those features, since attenuation of the laser beam can be reduced when the laser beam passes through the water, the laser beam can be introduced into the water at sufficient intensity even when the liquid reservoir chamber is constructed to have a larger thickness (depth). Further, by using the laser beam that has the wavelength range of 200 to 700 nm and is less absorbable by the water, the formation of a heat lens is suppressed and the laser beam can be more easily introduced to the inlet opening of the nozzle with higher accuracy. Hence, the nozzle can be prevented from being damaged, and stable machining quality can be ensured.

According to claim 5 of the present invention, in the laser machining apparatus according to any one of claims 1 to 4, the liquid reservoir chamber has a depth of 2 mm or more in the axial direction of the nozzle and is communicated at the outer peripheral edge on the upstream side thereof in the axial direction of the nozzle with the interconnecting channel.

With those features, since the depth of the liquid reservoir chamber in the axial direction of the nozzle is held at 2 mm or more and the outer peripheral edge of the liquid reservoir chamber is communicated at the upstream side thereof in the axial direction of the nozzle with the interconnecting channel, the flow speed of the jet liquid is reduced in the direction of the depth of the liquid reservoir chamber and the jet liquid is maintained in the liquid reservoir chamber in a more stable laminar state upstream of the nozzle.

Consequently, the jet liquid column being less susceptible to disturbances at the surface thereof and being free from fluctuations can be ejected from the nozzle and the propagation efficiency of the laser beam introduced into the jet liquid column can be increased.

In addition, since the depth of the liquid reservoir chamber in the axial direction of the nozzle is held at 2 mm or more, a laser beam guide window and optical system devices, e.g., a lens, can be kept apart from a focus point of the laser beam at the inlet opening of the nozzle. As a result, thermal distortions, etc. of the optical system devices can be avoided to ensure stable optical performance and durability is improved to ensure stable machining quality.

According to claim 6 of the present invention, in the laser machining apparatus according to any one of claims 1 to 5, wherein when the jet liquid is water, the liquid supply means includes a treatment apparatus for increasing homogeneity of the jet liquid which serves as a propagation medium for the laser beam.

With those features, for example, dissolved gas and particles both present as impurities in the jet liquid, and ions causing ionic luminescence are removed by the treatment apparatus, whereby the jet liquid column serving as the propagation medium for the laser beam can have homogeneity increased like glass.

Hence, a stabilized jet liquid column can be ejected from the nozzle and the propagation efficiency of the laser beam introduced into the jet liquid column can be increased.

According to claim 7 of the present invention, in the laser machining apparatus according to any one of claims 1 to 6, the laser machining apparatus further comprises an assist gas supply apparatus for introducing an assist gas along the jet liquid column, and the assist gas supply apparatus comprises a gas supply chamber disposed downstream of the nozzle and formed to accommodate the jet liquid column, and a guide channel for introducing the assist gas to the gas supply chamber, the guide channel being a spiral guide channel formed to spirally flow the assist gas along an outer periphery of the jet liquid column, or a conical guide channel formed to gradually approach an axis of the jet liquid column.

With those features, the assist gas is introduced along the jet liquid column such that the assist gas can be guided toward the outer periphery of the jet liquid column without causing a biased force to act upon the jet liquid column. Therefore, the jet liquid column being less susceptible to disturbances at the surface thereof and being free from fluctuations can be ejected from the nozzle and the propagation efficiency of the laser beam introduced into the jet liquid column can be increased.

Further, workability can be improved by efficiently removing not only the jet liquid that is accumulated on an upper surface of the workpiece and is unnecessary at the time of machining, but also the jet liquid that is splashed back from the surface under the machining.

According to claim 8 of the present invention, in the laser machining apparatus according to any one of claims 1 to 7, the liquid reservoir chamber has a larger volume than the cavity of the interconnecting channel.

With that feature, the jet liquid supplied from the cavity of the interconnecting channel flows into the liquid reservoir chamber having a larger volume. Therefore, the flow speed of the jet liquid in the liquid reservoir chamber is reduced and the laminar state can be more easily produced in the liquid reservoir chamber. Consequently, a stable jet liquid column can be ejected from the nozzle and the propagation efficiency of the laser beam introduced into the jet liquid column can be increased.

According to claim 9 of the present invention, in the laser machining apparatus according to any one of claims 1 to 8, a guide pipe for introducing the jet liquid from the liquid supply means is connected to the distribution channel, and a communicating portion between the interconnecting channel and the distribution channel is arranged at a position deviated from an axis of the guide pipe.

With those features, since the communicating portion between the interconnecting channel and the distribution channel is arranged at the position deviated from the axis of the guide pipe, the jet liquid introduced to the distribution channel from the guide pipe can be avoided from directly flowing into the interconnecting channel. Hence, the jet liquid from the distribution channel can be uniformly supplied to the interconnecting channel from all directions around the nozzle axis, and the laminar state of the jet liquid can be more easily produced in the liquid reservoir chamber.

According to claim 10 of the present invention, in the laser machining apparatus according to any one of claims 1 to 9, an outer peripheral surface of the interconnecting channel and an outer peripheral surface of the liquid reservoir chamber form a continuous surface without a level difference.

With that feature, the jet liquid moving along the outer peripheral surface of the interconnecting channel flows into the liquid reservoir chamber after moving along the coplanar surface, i.e., the outer peripheral surface of the liquid reservoir chamber which is formed in continuation with the outer peripheral surface of the interconnecting channel without a level difference. Therefore, the flow of the jet liquid from the interconnecting channel to the liquid reservoir chamber can be made smoother and the laminar state of the jet liquid can be more easily produced in the liquid reservoir chamber.

According to claim 11 of the present invention, in the laser machining apparatus according to any one of claims 1 to 10, the liquid reservoir chamber has a depth of 20 times or more a diameter of the nozzle in the axial direction of the nozzle.

With that feature, a sufficient flow passage area can be obtained in the liquid reservoir chamber with respect to a flow rate of the jet liquid ejected from the nozzle. Therefore, the flow speed in the liquid reservoir chamber can be sufficiently reduced and a liquid flow having no disturbances can be easily produced.

The laser machining apparatus according to the present invention, which uses the laser beam introduced into the jet liquid column, can improve the propagation efficiency of the laser beam and can ensure the stable machining quality.

DESCRIPTION OF THE PREFERRED EMBODIMENTS

A laser machining apparatus according to an embodiment of the present invention will be described in detail with reference to the drawings.

Figure 1:
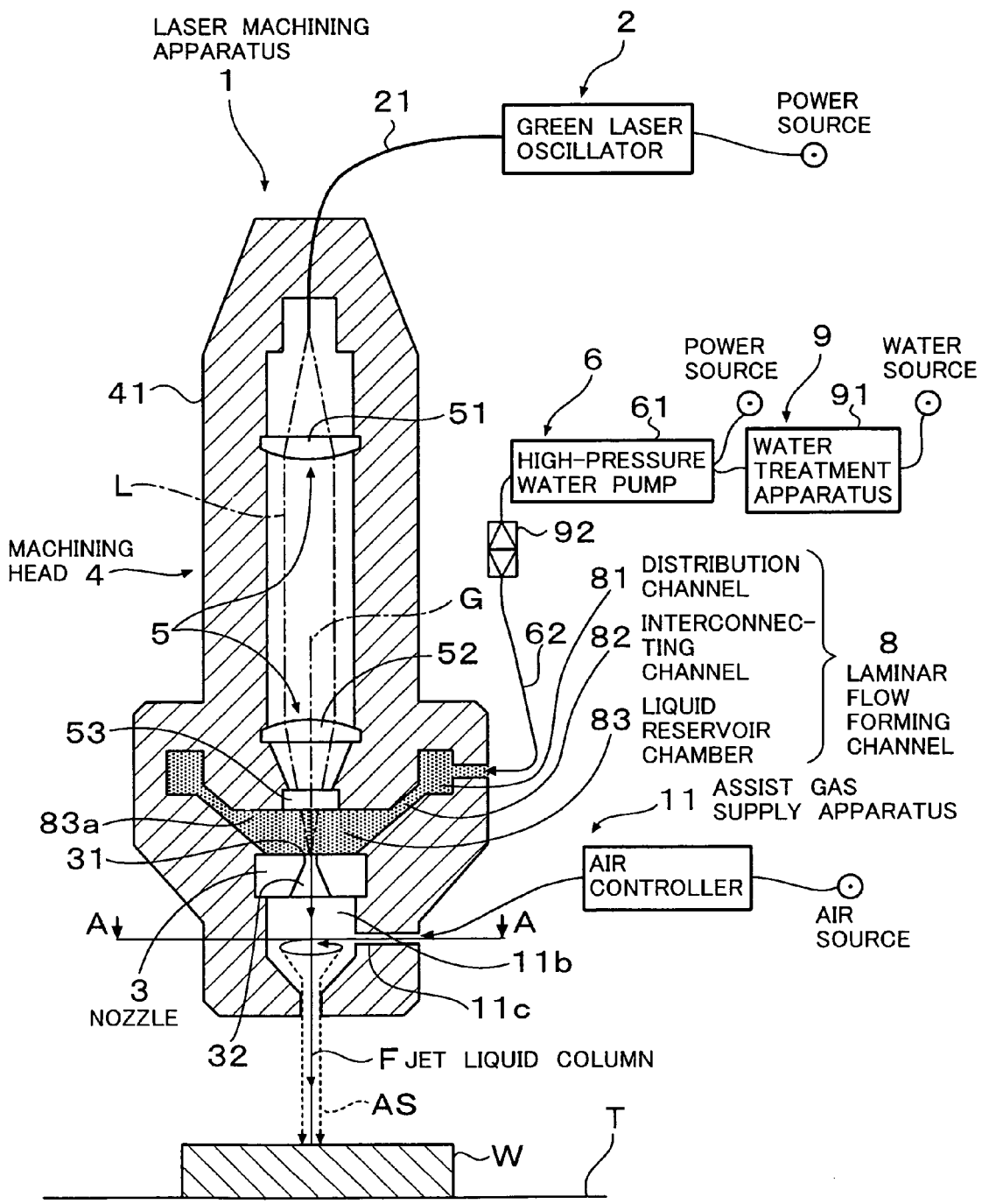
FIG. 1 is a side sectional view showing the overall construction of a laser machining apparatus according to an embodiment of the present invention.
Figure 2:
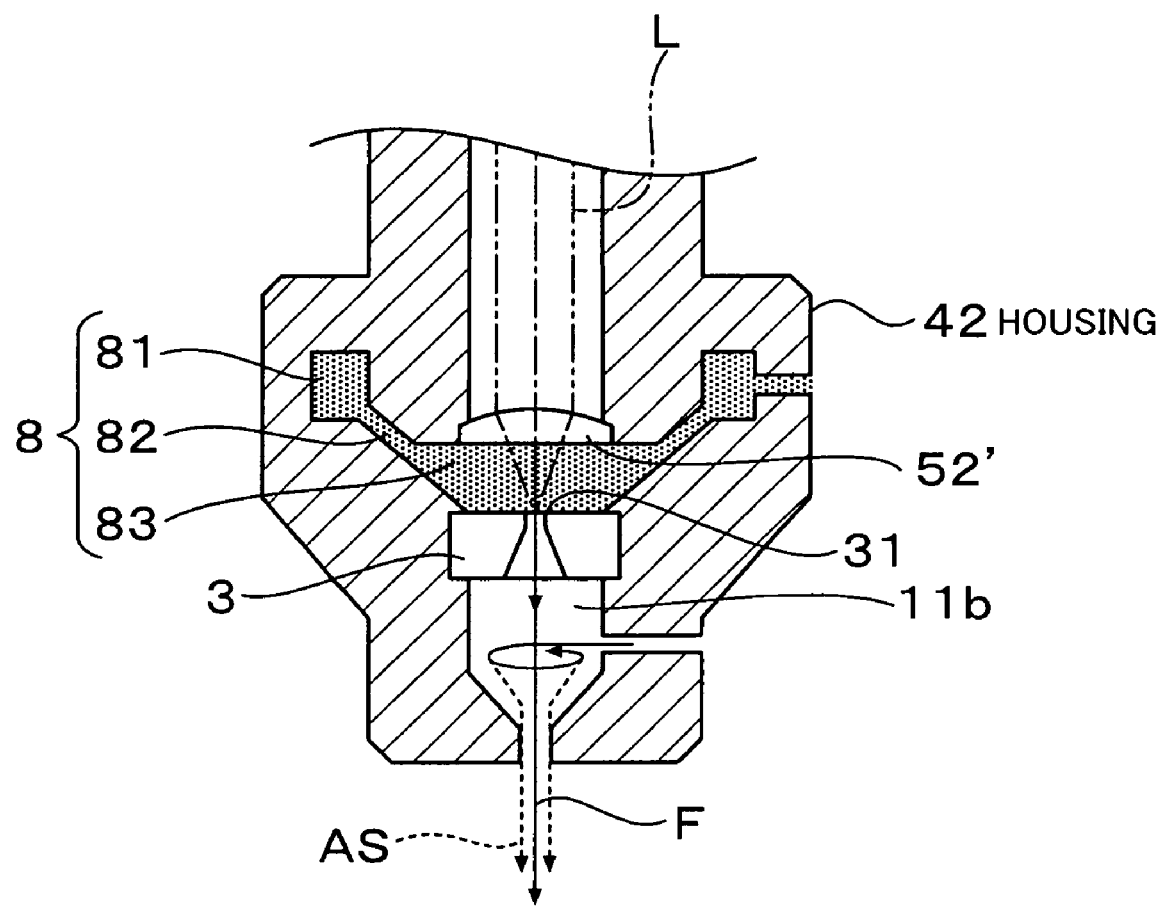
FIG. 2 is a partial enlarged view for explaining another example of an optical device used in the embodiment of the present invention, the view showing the case where a laser beam guide window is not provided.
Figure 3:
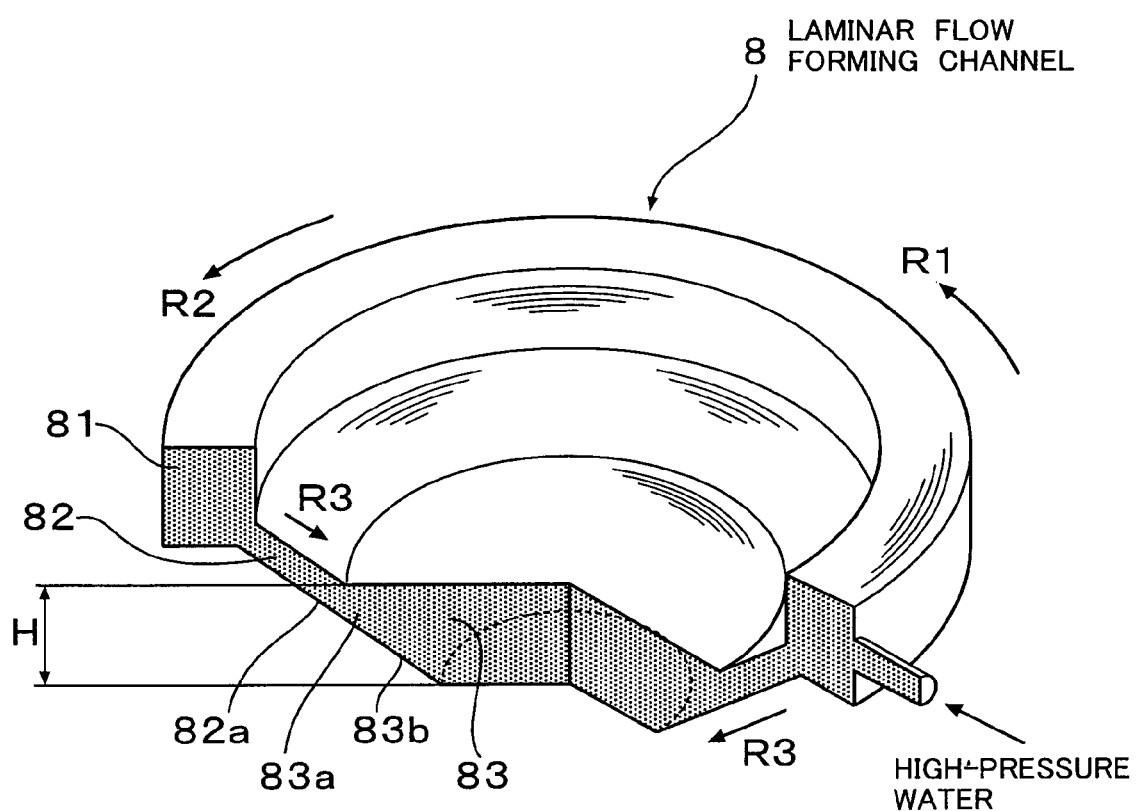
FIG. 3 is a perspective view showing the shape of a laminar flow forming channel according to the embodiment of the present invention.
Figure 4:
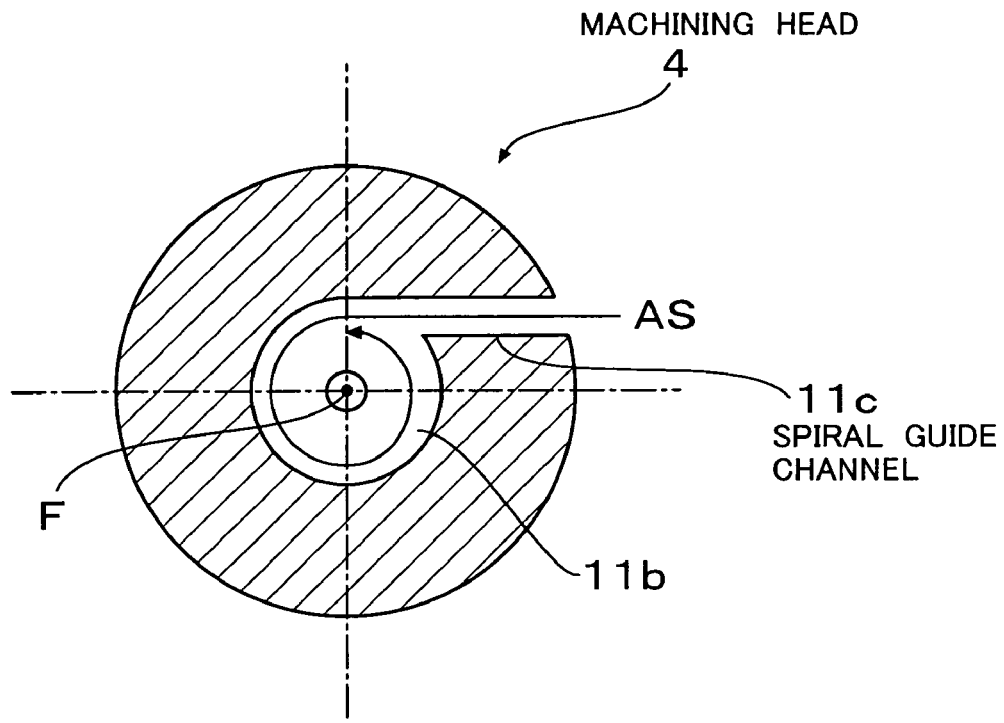
FIG. 4 is a sectional view taken along the line A-A in FIG. 1, the view showing the construction of a spiral guide channel in an assist gas supply apparatus according to the embodiment of the present invention.
Figure 5:
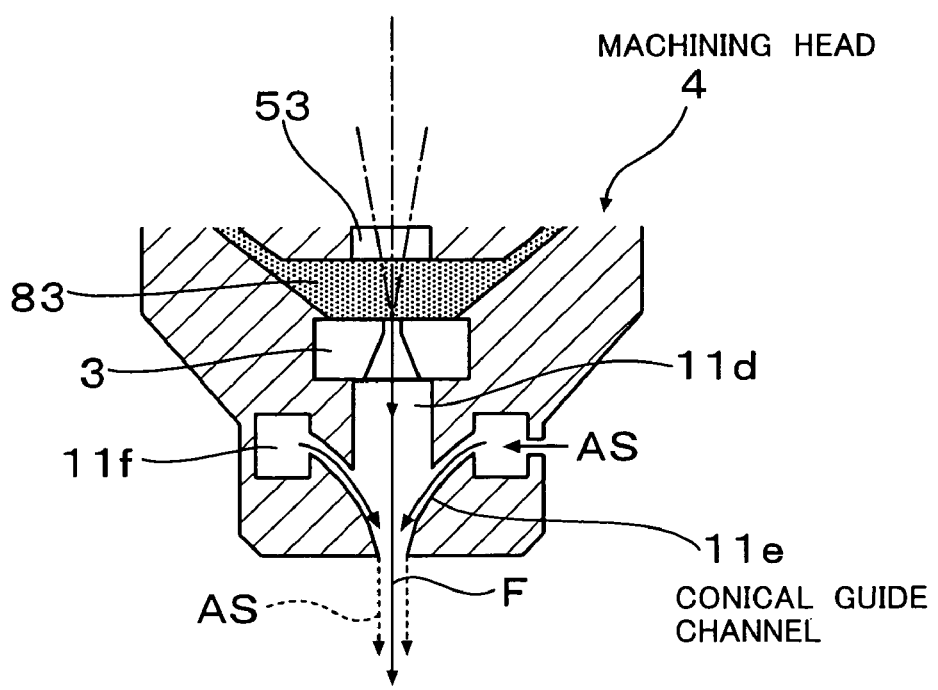
FIG. 5 is a side sectional view showing the construction of a conical guide channel according to another example of the assist gas supply apparatus.

Of the drawings referred to herein, FIG. 1 is a side sectional view showing the overall construction of the laser machining apparatus according to the embodiment of the present invention. FIG. 2 is a partial enlarged view for explaining another example of an optical device used in the embodiment of the present invention, the view showing the case where a laser beam guide window is not provided. FIG. 3 is a perspective view showing the shape of a laminar flow forming channel according to the embodiment of the present invention. FIG. 4 is a sectional view taken along the line A-A in FIG. 1, the view showing the construction of a spiral guide channel in an assist gas supply apparatus according to the embodiment of the present invention. FIG. 5 is a side sectional view showing the construction of a conical guide channel according to another example of the assist gas supply apparatus.

In the following description, the vertical (up-and-down) direction in FIG. 1 is assumed to be a vertical direction of a laser machining apparatus 1 in the embodiment. However, the orientation of a machining head 4 is not limited to the vertical direction, and the machining head 4 may be inclined with respect to the vertical direction.

The laser machining apparatus 1 according to the embodiment of the present invention comprises, as shown in FIG. 1, a green laser oscillator 2 for generating a laser beam L, i.e., a green laser, the machining head 4 provided with a nozzle 3 for ejecting high-pressure water, as a jet liquid, to a workpiece W, an optical device 5 for introducing the laser beam L to the nozzle 3, a liquid supply unit 6 for supplying the high-pressure water to the nozzle 3, a laminar flow forming channel 8 adjacently disposed upstream of the nozzle 3 and supplying the high-pressure water to the nozzle 3 in a laminar state, a treatment apparatus 9 for improving homogeneity of the jet liquid which serves as a propagation medium for the laser beam L, and an assist gas supply apparatus 11 for introducing an assist gas AS along a jet liquid column F.

With such a construction, laser machining is performed by moving a table T or the machining head 4 by a moving unit (not shown) while irradiating, to the workpiece W, the laser beam L introduced into a jet liquid column (water jet) F which is ejected from the nozzle 3.

As shown in FIG. 1, the green laser oscillator 2 generates a green laser as the laser beam L. The laser beam L is introduced from the green laser oscillator 2 to an optical fiber cable 21 and is condensed toward the nozzle 3 disposed in a lower portion of the machining head 4 from a top thereof.

The green laser is a second harmonic generation (SHG) YAG laser and has a wavelength of 532 nm. Unlike the YAG laser (with a wavelength of 1064 nm) and the $CO_2$ laser (with a wavelength of 10.6 μm), the green laser has a property being more transmissive through water. Therefore, when water easily available at a cheaper cost is used as the jet liquid, the propagation efficiency of the laser beam L can be increased.

Further, because the green laser is less absorbable by water, the occurrence of a thermal lens is suppressed and the laser beam L can be more easily introduced to an inlet opening 31 of the nozzle 3 with higher accuracy. As a result, the nozzle 3 can be avoided from being damaged and stable machining quality can be ensured.

The machining head 4 comprises a housing 41 formed in a substantially cylindrical shape, the optical device 5 arranged within the housing 41 in its upper portion, the laminar flow forming channel 8 disposed below the optical device 5, the nozzle 3 disposed below the laminar flow forming channel 8, and the assist gas supply apparatus 11 disposed below the nozzle 3.

The laser beam L irradiated downward from a top of the housing 41 is condensed toward the inlet opening 31 of the nozzle 3 by the optical device 5 and is introduced into the jet liquid column F ejected from the nozzle 3. Further, the laser beam L is introduced through the jet liquid column F while repeating internal total reflection and is then irradiated to the workpiece W.

The optical device 5 comprises a collimator lens 51 for converting the laser beam L radiated from the top of the housing 41 to a parallel beam, a condensing lens 52 for condensing the parallel beam converted by the collimator lens 51 toward the inlet opening 31 of the nozzle 3, and a guide window 53 adjacently disposed above the laminar flow forming channel 8 (specifically, a liquid reservoir chamber 83) and introducing the laser beam L to the laminar flow forming channel 8.

Although, in this embodiment, the guide window 53 for the laser beam L is disposed above the liquid reservoir chamber 83 as shown in FIG. 1, the present invention is not limited to such an arrangement. Instead of the guide window 53 shown in FIG. 1, a condensing lens 52' may be disposed at the position of the guide window 53 (see FIG. 2).

The liquid supply unit 6 comprises a high-pressure water pump 61 for sucking water from a water supply tank (not shown) and increasing a water pressure, and a high-pressure pipe 62 for supplying the water under an increased high pressure to the laminar flow forming channel 8.

Further, the high-pressure water pump 61 employs a servo drive pump which is constructed so as to push out the water at a constant flow rate in cooperation with a servo motor and a ball screw by detecting a delivery pressure of the pump and performing feedback control such that the delivery pressure is held constant.

With such a construction, a stable flow of the high-pressure water can be generated and supplied to the laminar flow forming channel 8.

The laminar flow forming channel 8 comprises a distribution channel 81 formed as a cavity for annularly distributing the high-pressure water, i.e., the jet liquid supplied from the liquid supply unit 6, around an axis G of the nozzle 3, an interconnecting channel 82 which is disposed to be communicated with the distribution channel 81 on the downstream side thereof in the direction of the nozzle axis G and which is formed as an annular cavity around the nozzle axis G, the annular cavity providing a narrower flow passage than the distribution channel 81, and the liquid reservoir chamber 83 adjacently disposed upstream of the nozzle 3 in the direction of the nozzle axis G and storing the high-pressure water to be supplied to the nozzle 3.

The interconnecting channel 82 and the liquid reservoir chamber 83 are communicated with each other over an entire circumference of the annular interconnecting channel 82 at an outer peripheral edge 83a of the liquid reservoir chamber 83.

In this embodiment, the interconnecting channel 82 is communicated with the distribution channel 81 at the upstream side thereof in the direction of the nozzle axis G, and it is formed to provide a cylindrically tapered channel that has a diameter smaller in the downstream side than the upstream side in the direction of the nozzle axis G. Also, the liquid reservoir chamber 83 is formed in the shape of a reversed truncated cone having a diameter smaller in the downstream side than the upstream side in the direction of the nozzle axis G.

Further, an outer peripheral surface 82a of the interconnecting channel 82 and an outer peripheral surface 83b of the liquid reservoir chamber 83 are positioned to continuously extend on the same plane without a level difference. In addition, the direction in which the outer peripheral surfaces 82a and 83b are extended is inclined inward (toward the nozzle side) with respect to the direction of the nozzle axis G.

With such a construction, the high-pressure water stored in the distribution channel 81 is introduced from the interconnecting channel 82 to the liquid reservoir chamber 83 along the slope of its outer peripheral surface 83b. Therefore, the fluid flow is properly controlled so that the high-pressure water is stored in the liquid reservoir chamber 83 and supplied to the nozzle 3 in a stable laminar state.

The liquid reservoir chamber 83 has a depth (height H) of 3 mm in the direction of the nozzle axis G and is communicated at the outer peripheral edge 83a on the upstream side thereof in the direction of the nozzle axis G with the interconnecting channel 82.

The depth (height H) of the liquid reservoir chamber 83 in the direction of the nozzle axis G is preferably 2 mm or more. As described later in detail, the larger the depth of the liquid reservoir chamber 83, the lower is the speed of the jet liquid within the liquid reservoir chamber 83. Therefore, increasing the depth of the liquid reservoir chamber 83 is advantageous in forming the laminar flow in a portion of the liquid reservoir chamber 83 just above the nozzle 3. Further, by increasing the depth of the liquid reservoir chamber 83, the laser beam passes the guide window 53 before the laser beam is focused to a small spot. This is effective in reducing an energy density of the laser beam passing the guide window 53 and in protecting the guide window 53. For that reason, the depth (height H) of the liquid reservoir chamber 83 in the direction of the nozzle axis G is preferably set to a value in the range of 2 to 40 mm, as required, in consideration of a limitation on a usable space and a demanded response.

[Detailed Shape of Laminar Flow Forming Channel According to Embodiment]

A preferred shape of the laminar flow forming channel 8 according to the embodiment will be described in more detail below.

Figure 6:
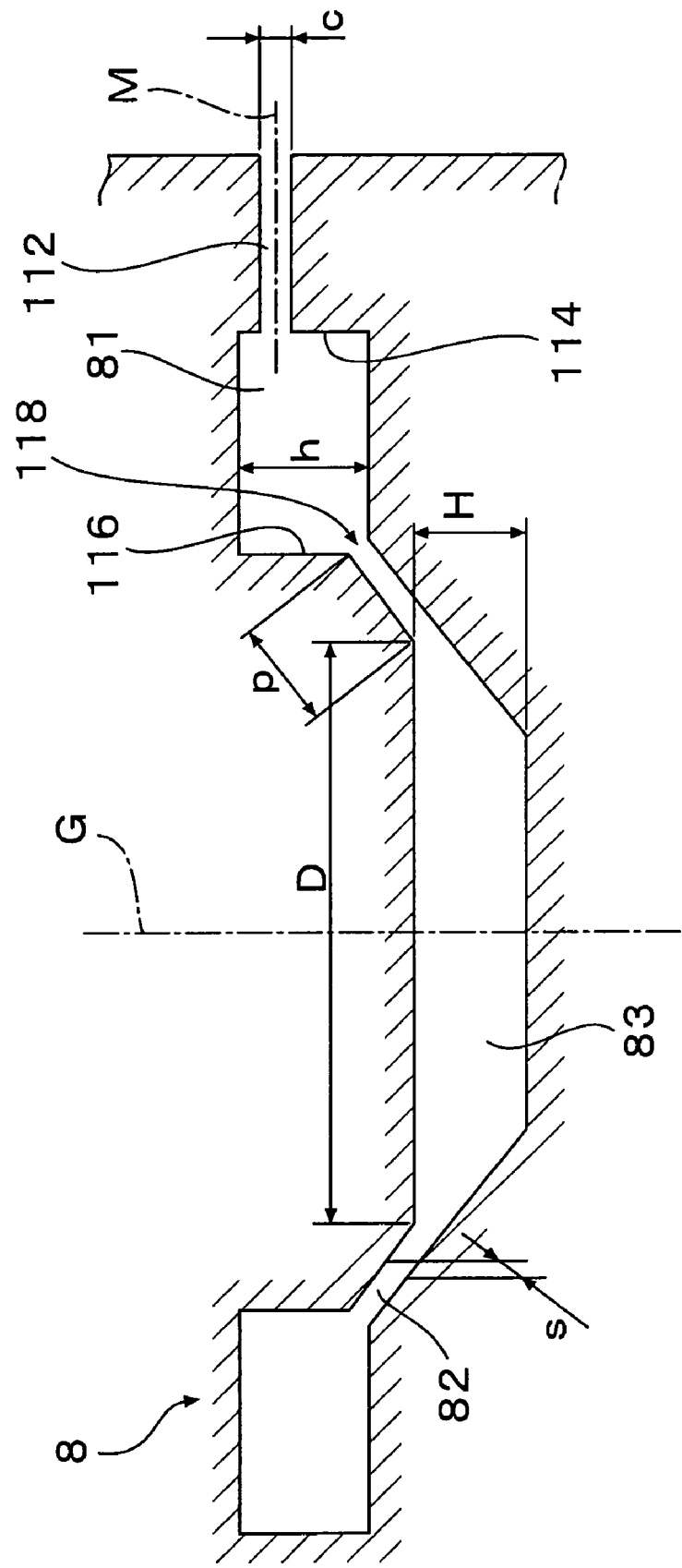
FIG. 6 is a sectional view, taken along an axial direction, of the laminar flow forming channel according to the embodiment.

FIG. 6 is a sectional view, taken along the direction of the axis G, of the laminar flow forming channel 8 according to the embodiment. The laminar flow forming channel 8 is shaped such that the high-pressure water supplied from the high-pressure pump can be temporarily stored in the liquid reservoir chamber 83 so as to produce a laminar state while suppressing generation of eddies, etc. and the jet liquid column F having no surface disturbances can be ejected out from the nozzle 3.

More specifically, as shown in the sectional view of FIG. 6, the distribution channel 81 of the laminar flow forming channel 8 is formed as an annular space having a substantially rectangular shape in cross-section and defined by an outer peripheral wall surface 114 to which is connected a guide pipe 112 for introducing the water from the high-pressure pump, and by an inner peripheral wall surface 116 disposed opposite to the outer peripheral wall surface 114. A size h of the outer peripheral wall surface 114 in the direction of the axis G is set to be larger than a diameter c of the guide pipe 112. Further, the guide pipe 112 is connected to the outer peripheral wall surface 114 at a position on the upstream side in the direction of the axis G. The inner peripheral wall surface 116 is arranged in a crossing relation to an axis M of the guide pipe 112.

Herein, the distribution channel 81 is preferably shaped to have such a cross-sectional area as allowing a water flow speed within the distribution channel 81 to be held at ½ to ⅒ of the water flow speed within the interconnecting channel 82 so that the water in the distribution channel 81 is introduced to the liquid reservoir chamber 83 from all directions.

The interconnecting channel 82 is arranged such that its upstream-side communication port 118 is connected to the inner peripheral wall surface 116 of the distribution channel 81 at the downstream side thereof in the direction of the nozzle axis G. With such an arrangement, the communication port 118 of the interconnecting channel 82 is positioned offset from the axis M of the water guide pipe 112. Also, the interconnecting channel 82 is formed to extend from the distribution channel 81 toward the liquid reservoir chamber 83 while inclining inward and downstream in the direction of the axis G, thereby defining a thin channel to narrow a flow passage between the distribution channel 81 and the liquid reservoir chamber 83.

A diameter D of the interconnecting channel 82 at its downstream annular end is set in consideration of the size of the machining head 4, the capability of the laser machining apparatus 1, etc., and it can be set to, e.g., 10 mm to 40 mm.

Further, a length p of the interconnecting channel 82 can be selected, as appropriate, depending on the shape and size of the machining head 4, the degree of freedom of a usable space, etc. Since inner and outer peripheral surfaces of the interconnecting channel 82 have the function of suppressing eddies generated in the water flow from the distribution channel 81, the length p of the interconnecting channel 82 is preferably set to be able to effectively develop that function. In practice, the length p is preferably set to be about 1 to 20 times a gap size s between the inner and outer peripheral surfaces of the interconnecting channel 82.

Regardless of the gap size s of the interconnecting channel 82 being set to any value, the Reynolds number will not change if the diameter D of the interconnecting channel 82 connected to the liquid reservoir chamber 83 and a flow rate Q of the liquid flowing out of the nozzle 3 are both held constant. Accordingly, the gap size s of the interconnecting channel 82 can be set in consideration of various conditions, e.g., the dimensions of the distribution channel 81 and the pressure of the supplied water, so that the water can be introduced to the liquid reservoir chamber 83 from the distribution channel 81 in all directions. The gap size s is usually set to 0.3 mm to 2 mm.

The depth of the liquid reservoir chamber 83 in the direction of the axis G is set, as described above, to be larger than that in the known structure described in Patent Document 1, for example, and it is preferably set to 2 mm or more in practice. Further, the volume of the liquid reservoir chamber 83 is set to be larger than that of the interconnecting channel 82.

In the laminar flow forming channel 8 having the above-described structure, when the water is supplied through the guide pipe 112 by the high-pressure pump, the water advances toward the inner peripheral wall surface 116 while spreading over the entire circumference of the distribution channel 81. Since the inner peripheral wall surface 116 is arranged to intersect the axis M of the guide pipe 112 and the interconnecting channel 82 is arranged not to intersect the axis M, the water supplied from the high-pressure pump is avoided from directly entering the interconnecting channel 82 and is first distributed over the entire circumference of the distribution channel 81. Accordingly, a force of the high-pressure water supplied through the guide pipe 112 is dampened in the distribution channel 81.

The water from the distribution channel 81 flows into the interconnecting channel 82 from all directions. The interconnecting channel 82 has not only the function of suppressing eddies, which are generated in the water flow within the distribution channel 81 due to the operation of the high-pressure pump, at the inner and outer peripheral surfaces of the interconnecting channel 82, but also the function of supplying the water to the liquid reservoir chamber 83 from all directions in a distributing way.

The water having flown into the interconnecting channel 82 flows into the liquid reservoir chamber 83. As described above, the liquid reservoir chamber 83 serves to store the water therein and to reduce the water flow speed primarily with the setting of the increased depth size so that the water flow is controlled into a laminar state.

As a result of the above-described process, the jet liquid column F ejected from the nozzle 3 is less susceptible to disturbances at the surface thereof and is free from fluctuations. Accordingly, loss of the propagation efficiency of the laser beam L introduced through the jet liquid column F is also reduced.

Further, as shown in FIG. 5, the nozzle 3 has a disk-like shape and includes, formed on its upper surface, the inlet opening 31 toward which the laser beam L is condensed. Below the inlet opening 31, a jet opening 32 is formed to have a diameter gradually increasing downward. The laser beam L is introduced into the jet liquid column F ejected from the jet opening 32 downward and is then irradiated to the workpiece W.

The treatment apparatus 9 serves to remove dissolved gas and particles which are present as impurities in the jet liquid, i.e., the water, and ions which cause ionic luminescence. For example, the treatment apparatus 9 can be constituted by a water treatment apparatus 91 (including a degassing apparatus and an ion exchange resin) and a high-pressure filter 92.

The assist gas supply apparatus 11 comprises, as shown in FIG. 1, an air controller 11a for adjusting the pressure of the assist gas AS, a gas supply chamber 11b disposed downstream of the nozzle 3 and formed to accommodate the jet liquid column F, and a spiral guide channel 11c for introducing the assist gas AS to the gas supply chamber 11b.

As shown in FIG. 4, the spiral guide channel 11c is formed to introduce the assist gas AS to a position deviated from the direction of an axis of the jet liquid column F so that the assist gas AS spirally flows along an outer periphery of the jet liquid column F.

As another example of the guide channel, as shown in FIG. 5, the guide channel can be constituted as a conical guide channel 11e formed to incline downward while gradually approaching the axis of the jet liquid column F that is accommodated in a gas supply chamber 11d. Further, the conical guide channel 11e has a distribution channel 11f which is formed in a toric shape surrounding the gas supply chamber 11d and which serves to distribute the assist gas AS. The assist gas AS is supplied from the distribution channel 11f so as to gradually approach the axis of the jet liquid column F with the gas flowing downward.

The operation and the working advantages of the thus-constructed laser machining apparatus 1 according to the embodiment will be described below with reference primarily to FIG. 3.

In the laser machining apparatus 1, as shown in FIG. 1, the laminar flow forming channel 8 for supplying the high-pressure water to the nozzle 3 in the laminar state is provided to produce a water flow in a stable laminar state (i.e., a state having a small Reynolds number) upstream of the nozzle 3, whereby the jet liquid column F being less susceptible to disturbances at the surface thereof and being free from fluctuations is ejected from the nozzle 3.

More specifically, as shown in FIG. 3, the supplied high-pressure water is annularly distributed by the distribution channel 81 around the nozzle axis G (as denoted by flows R1 and R2). Herein, the cross-sectional area of the distribution channel 81 is set to be sufficiently much larger than that of the water supply passage (guide pipe 112) through which the high-pressure water is introduced to the distribution channel 81. Therefore, when the introduced high-pressure water flows into the distribution channel 81, the flow speed of the high-pressure water is so sufficiently reduced as to remove disturbances that are generated upon the water flowing into the distribution channel 81. Further, the high-pressure water flows through the interconnecting channel 82 which is formed in the annular shape and which has a narrower flow passage than the distribution channel 81. Hence, the high-pressure water is introduced to the liquid reservoir chamber 83 in a state where turbulent flows are suppressed.

In addition, since the outer peripheral edge 83a of the liquid reservoir chamber 83 is communicated at the outer peripheral surface 83b with the annular interconnecting channel 82 over the entire circumference thereof, the high-pressure water is uniformly introduced to the outer peripheral edge 83a of the liquid reservoir chamber 83 from the entire circumference of the interconnecting channel 82 (as denoted by a flow R3). Herein, the height H of the liquid reservoir chamber 83 is set to be larger than that of the interconnecting channel 82. Accordingly, when the high-pressure water flows into the liquid reservoir chamber 83 from the interconnecting channel 82, the cross-sectional area of the flow passage for the high-pressure water is increased, whereby the flow speed of the high-pressure water is reduced and the high-pressure water is maintained in the liquid reservoir chamber 83 in the stable laminar state.

Thus, by providing the liquid reservoir chamber 83 which produces the stable laminar state upstream of the nozzle 3, the jet liquid column F being less susceptible to disturbances at the surface thereof and being free from fluctuations can be ejected from the nozzle 3. As a result, the propagation efficiency of the laser beam L introduced into the jet liquid column F can be increased.

[Propagation Efficiency of Green Laser in Embodiment]

Figure 7:
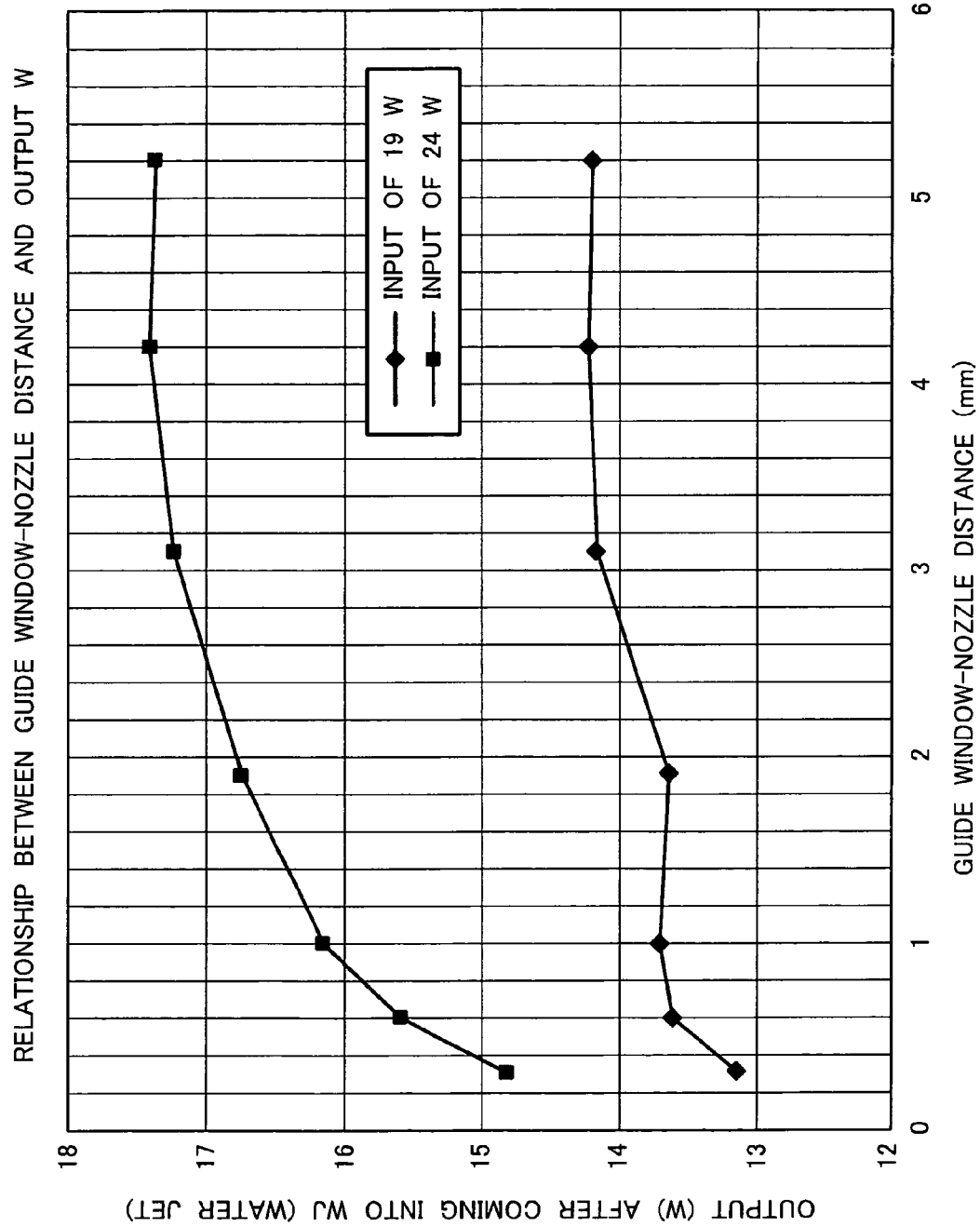
FIG. 7 is a graph showing the relationship between a depth (height H, i.e., distance between the guide window and a nozzle) in the direction of an axis G of the nozzle and the propagation efficiency of a laser beam.
Figure 8:
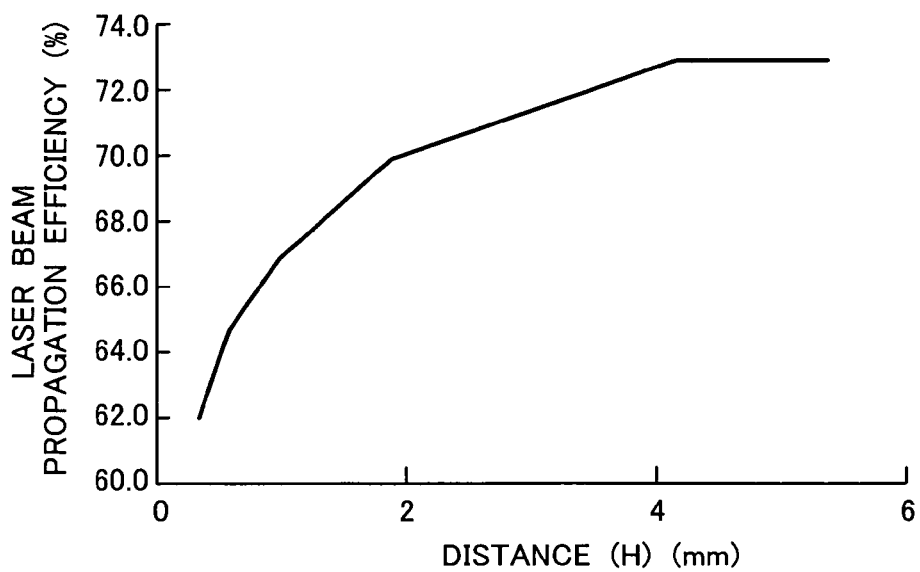
FIG. 8 is a graph showing the propagation efficiency of a green laser with respect to the height H of a liquid reservoir chamber when the green laser is passed through a liquid column beam of water.

Next, the propagation efficiency of the laser beam L passing through the liquid reservoir chamber 83 will be described with reference to FIGS. 7 and 8. FIG. 7 is a graph showing outputs of the laser beam emitted when the laser beams of 19 W and 24 W are introduced to the liquid reservoir chambers having various depths (heights H, i.e., distances between the guide window and the nozzle). FIG. 8 is a graph showing the propagation efficiency of the laser beam when the laser beam is passed through the liquid reservoir chamber having various depths (heights H, i.e., distances between the guide window and the nozzle).

FIG. 7 shows the relationship between the output of the laser beam L and the guide window—nozzle distance in the case where the nozzle diameter φ is 100 μm, the jet pressure is 10 MPa, and the frequency of the laser beam L is 10 kHz. In FIG. 7, the vertical axis represents the output of the laser beam (measured at a position spaced 20 mm downward from the nozzle 3), and the horizontal axis represents the guide window—nozzle distance.

As shown in FIG. 7, when the guide window—nozzle distance is set to 3 mm, the output of about 17.2 W is obtained in the case of the input being 24 W. At the larger guide window—nozzle distance, the output is gradually increased. Also, when the guide window—nozzle distance is set to 3 mm, the output of about 14.2 W is obtained in the case of the input being 19 W. At the larger guide window—nozzle distance, the output is gradually increased. Those results indicate that as the guide window—nozzle distance increases, lowering of power of the laser beam caused by passing through the liquid is reduced in spite of an increase of the distance through which the incident laser beam passes the entire liquid.

Herein, the output of the laser beam L means the propagation efficiency of the laser beam L that propagates through the jet liquid column F. Hence, the output of the laser beam L represents a degree of suitability of the jet liquid column F as a propagation medium for the laser beam. A higher output of the laser beam L indicates that the jet liquid column F is in a more stable laminar state. In other words, it is understood that, by setting the guide window—nozzle distance to a larger value, a more stable laminar state is formed and maintained.

Thus, by setting the depth of the liquid reservoir chamber 83 in the direction of the nozzle axis G to 3 mm, i.e., a value of not less than 2 mm, the flow speed of the high-pressure water is reduced in the direction of the depth and the high-pressure water is stored in the liquid reservoir chamber 83 in the more stable laminar state upstream of the nozzle 3.

As a result, the jet liquid column F being less susceptible to disturbances at the surface thereof and being free from fluctuations can be ejected from the nozzle 3, and the propagation efficiency of the laser beam L introduced into the jet liquid column F can be increased (see FIG. 7).

Next, the propagation efficiency in the case of using the green laser as the laser beam will be described with reference to FIG. 8.

FIG. 8 is a graph showing the propagation efficiency of the green laser with respect to a distance from a inlet opening of the nozzle when the laser beam is passed through the jet liquid column of water. It is here assumed that the output of the green laser is 24 W, the nozzle diameter is 100 μm, and the water pressure is 10 MPa.

As shown in FIG. 8, the propagation efficiency of the green laser is gradually increased as the height H of the liquid reservoir chamber increases. As described above, at a larger height H of the liquid reservoir chamber, since the distance through which the laser beam passes in the liquid is increased and the laser beam is absorbed in a larger amount by the liquid, the propagation efficiency of the laser beam should be reduced. In practice, however, the propagation efficiency is increased. The reason presumably resides in that increasing the height H of the liquid reservoir chamber reduces flow disturbances in the liquid reservoir chamber and the jet liquid column. It is hence understood that, in the case of using the green laser, the effect resulting from reducing the flow disturbances is increased and the propagation efficiency is improved until the height H of the liquid reservoir chamber reaches about 4 mm, as shown in FIG. 8.

On the other hand, the reason why the propagation efficiency of the laser beam is reduced at a smaller height H of the liquid reservoir chamber presumably resides in not the influence of a thermal lens, but resides in that the flow upstream of the inlet opening of the nozzle becomes unstable as the height H of the liquid reservoir chamber reduces. Stated another way, when the height H of the liquid reservoir chamber is reduced, the water flow in a region upstream of the inlet opening of the nozzle becomes a turbulent flow, which disturbs the jet liquid column, and the laser beam cannot be satisfactorily introduced through the jet liquid column.

As seen from the above discussion, when the green laser having a low heat absorbance against water is used as the laser beam, the influence of a thermal lens is very small or substantially negligible. Accordingly, in the case of using the laser beam having a low heat absorbance against water, it is not required to reduce the height H of the liquid reservoir chamber for the purpose of increasing the flow speed in the liquid reservoir chamber to suppress the formation of the thermal lens, as in the apparatus described in Patent Document 1. Conversely, the propagation efficiency of the laser beam can be improved by setting the height H of the liquid reservoir chamber to a larger value so that the flow speed in the liquid reservoir chamber is reduced to suppress flow disturbances in both the liquid reservoir chamber and the jet liquid column.

Thus, setting the larger guide window—nozzle distance (height H of the liquid reservoir chamber) to a large value is advantageous in protecting the guide window and forming the laminar flow upstream of the nozzle 3. In practice, however, the larger guide window—nozzle distance is preferably set to a value in the range of 2 to 40 mm or, from the viewpoint of the nozzle diameter, in the range of 20 to 400 times the diameter of the nozzle 3, as required, in consideration of a limitation on a usable space and a demanded response.

Further, by setting the depth of the liquid reservoir chamber 83 in the axial direction of the nozzle 3 to 3 mm, i.e., a value of not less than 2 mm, the guide window 53, etc. (including the condensing lens 52 in the example of FIG. 2) can be kept away from a laser focused point at the inlet opening 31 of the nozzle 3. Accordingly, the guide window 53, etc. can be avoided from undergoing thermal distortions, etc. and stable optical performance can be ensured. In addition, durability can be improved and stable machining quality can be ensured.

While the depth of the liquid reservoir chamber 83 in the axial direction of the nozzle 3 is set to 3 mm in this embodiment, it can also be set, in consideration of the nozzle diameter, to be 20 times or more of the nozzle diameter. The reason is that, at a larger nozzle diameter, since the flow rate of the high-pressure water ejected from the nozzle 3 is increased, the stable laminar state can be more easily formed by setting the depth of the liquid reservoir chamber 83 in the axial direction of the nozzle 3 to a larger value. For example, when the nozzle diameter φ is 150 μm, the depth of the liquid reservoir chamber 83 in the axial direction of the nozzle 3 is preferably set to 3 mm or more, e.g., 4 to 5 mm.

[Relationship Between Height of Liquid Reservoir Chamber and Liquid Flow Speed in Liquid Reservoir Chamber in Embodiment]

Figure 9:
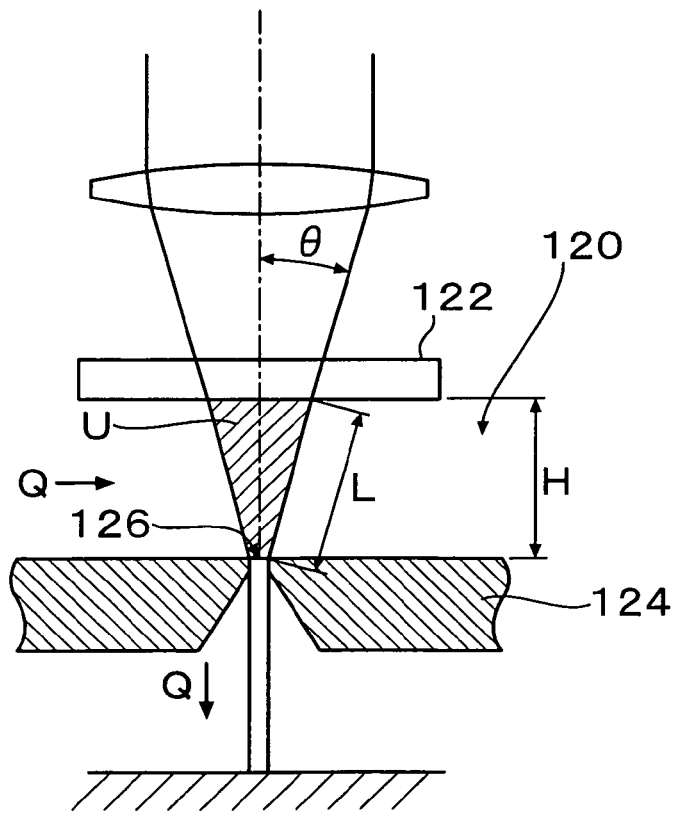
FIG. 9 is a schematic view showing the structure of the liquid reservoir chamber (liquid supply passage) around the nozzle according to the embodiment of the present invention.

Next, the flow speed along a peripheral surface of a region (space) where the laser beam L is irradiated in the liquid reservoir chamber 83 according to this embodiment is compared with the flow speed along a peripheral surface of a region (space) where the laser beam is irradiated in the liquid supply passage of the known structure, by referring to FIG. 9.

FIG. 9 is a schematic view showing the structure of the liquid reservoir chamber (liquid supply passage) around the nozzle. In FIG. 9, a region U where the laser beam L is irradiated in a liquid reservoir chamber 120 is provided by a truncated cone that is formed between a guide window 122 and an inlet opening 126 of a nozzle 124. An average flow speed of the liquid passing along a peripheral surface (side surface) of the region U in the form of a truncated cone is calculated and compared between the case of using the liquid reservoir chamber 83 according to this embodiment and the case of using the liquid supply passage in the apparatus described in Patent Document 1.

In the liquid reservoir chamber 83 according to this embodiment, the depth (height) H of the liquid reservoir chamber 83 in the direction of the nozzle axis G is assumed to be H=2 mm, i.e., a minimum value in the preferable range of the depth size. Also, the liquid supply passage of the known structure, described in Patent Document 1, is assumed to have H=0.5 mm. Other conditions are set to values common to both the cases. More specifically, water is used as the jet liquid, the nozzle diameter is set to 150 μm, and the water supply pressure is set to 80 bar (8 MPa). An angle θ of the side surface of the truncated-conical region U with respect to the axis is set here to 10° because it is usually set to about 10° so that the laser beam is totally reflected within the water column and a focus diameter of the laser beam smaller than the nozzle diameter can be obtained.

Under the above-described conditions, a water flow rate Q is obtained as 1700 mm³/s based on the following formula 1.

$$Q = \frac{0.685 \times \sqrt{P \cdot 10.2} \cdot d^2}{n^2} \quad \text{(Formula 1)}$$

(n = nozzle coefficient = 1.14)

Also, a side surface area A of the truncated-conical region U is obtained by the following formula 2. In the formula 2, r is the radius of an apex circular surface of the truncated-conical region U, and it is equal to the radius of the nozzle, i.e., r=75 μm. R is the radius of a bottom circular surface of the truncated-conical region U, and it is expressed by R=H·tan θ. Further, L is the length along the side surface of the truncated-conical region U, and it is expressed by L=H/cos θ.

$$A = \pi(R+r)L \quad \text{(Formula 2)}$$

Accordingly, because the average flow speed of the liquid passing along the peripheral surface (side surface) of the truncated-conical region U in the liquid reservoir chamber 83 is calculated by Q/A, a ratio R of an average flow speed V1 in the case of using the liquid reservoir chamber 83 according to this embodiment and an average flow speed V2 in the apparatus described in Patent Document 1 is obtained by the following formula (3).

$$\begin{aligned} R &= \frac{Q/A'}{Q/A} \quad \text{(Formula 3)} \\ &= \frac{Q/\pi(R'+r')l'}{Q/\pi(R+r)l} \\ &= \frac{Q/\pi \cdot (H'\tan\theta + r') \cdot H'/\cos\theta}{Q/\pi \cdot (H\tan\theta + r) \cdot H/\cos\theta} \end{aligned}$$

From the foregoing formula, the ratio R can be determined as R=1/10.5. Further, the average flow speed is calculated as 623.3 mm/sec in the liquid reservoir chamber 83 according to this embodiment, and the average flow speed is calculated as 6542 mm/sec in the apparatus described in Patent Document 1. It is hence understood that the average flow speed in the laser machining apparatus of this embodiment is much slower than that in the known apparatus.

Stated another way, when the liquid reservoir chamber 83 according to this embodiment is used, the water flow speed in the liquid reservoir chamber 83 is about ⅒ of that in the liquid supply passage of the known structure. Additionally, when the depth of the liquid reservoir chamber 83 according to this embodiment is set to a more preferable value, i.e., 4 mm, as required, the average flow speed is further reduced and the ratio R of the average flow speed is determined as about ⅟38.

As is apparent from the above description, by setting the depth of the liquid reservoir chamber 83 in the direction of the axis G to a larger value, specifically a value of not less than 2 mm and more preferably of not less than 4 mm, the water flow speed in the liquid reservoir chamber 83 can be greatly reduced in comparison with the case of using the liquid supply passage of the known structure. Causing the water to flow in the liquid reservoir chamber 83 in such a manner as reducing the flow speed therein is effective, as described above, in producing the stable laminar state of the water upstream of the nozzle 3.

More specifically, the apparatus described in Patent Document 1 has the structure where the depth of the liquid supply passage is set to a smaller value to increase the water flow speed in the liquid supply passage with attention primarily focused on suppressing the formation of the thermal lens in the truncated-conical region U. Therefore, the water in the liquid supply passage tends to become a turbulent-flow, which disturbs the jet liquid column. Accordingly, the propagation efficiency of the laser beam cannot be satisfactorily increased in spite of suppressing the formation of the thermal lens. In contrast, in the liquid reservoir chamber 83 according to this embodiment, by setting the depth of the liquid reservoir chamber 83 to a larger value, the water can be passed through the liquid reservoir chamber 83 in such a manner as reducing the flow speed therein and the stable laminar state can be produced. As a result, the jet liquid column F having no disturbances can be formed and the propagation efficiency of the laser beam can be increased.

[Reynolds Number of Water in Liquid Reservoir Chamber According to Embodiment]

Next, the Reynolds number of water in the truncated-conical region U inside the liquid reservoir chamber 83 according to this embodiment is compared with the Reynolds number of water in the truncated-conical region U inside the liquid supply passage of the known structure by referring to the exemplary structure shown in FIG. 9.

The Reynolds number is calculated for the structure of the liquid reservoir chamber 83 according to this embodiment in which the depth H is set to 2 mm and 4 mm in the schematic view of FIG. 9, and for the known structure of the apparatus described in Patent Document 1 in which the depth H is set to 0.5 mm.

The Reynolds number is expressed by the following formula 4 where V is the average flow speed, L is the length between the nozzle and the guide window along the peripheral surface of the truncated-conical region U as shown in FIG. 9, and ν is the dynamic viscosity coefficient of water at 20° C. The average flow speed V is provided by the value calculated using the formula 3. More specifically, the average flow speed V is 0.623 m/s in the case of the depth H=2 mm and 0.171 m/s in the case of the depth H=4 mm in the liquid reservoir chamber 83 according to this embodiment. Also, the average flow speed V is 6.542 m/s in the case of the depth H=0.5 mm in the liquid supply passage of the known structure. Further, the dynamic viscosity coefficient ν of water is assumed to be 1.01×10⁻⁶ m²/s.

$$Re = \frac{V \cdot L}{\nu} \quad \text{(Formula 4)}$$

The Reynolds numbers Re calculated from the formula 4 in the respective conditions are Re=1252 in the case of the depth H=2 mm, Re=688 in the case of the depth H=4 mm, and Re=3288 in the case of the depth H=0.5 mm. Herein, in a structure surrounded by parallel flat surfaces of the nozzle 3 and the guide window 53 as with the machining head 4, the minimum critical Reynolds number at the boundary between a turbulent flow and a laminar flow can be regarded comparable to the minimum critical Reynolds number of a minimum pipe line in a flow defined by parallel walls, i.e., it can be assumed to be Re=1000. Thus, it is understood that, in the liquid supply passage of the known structure, the Reynolds number takes a value of 3288 greatly exceeding the minimum critical Reynolds number and the interior of the liquid supply passage is in a state tending to cause a turbulent flow.

Although the Reynolds number Re also exceeds the minimum critical Reynolds number in the case of the depth H=2 mm, that Reynolds number represents a value when the nozzle diameter is set to 150 μm. When the nozzle diameter is set to a smaller value, the flow rate of the liquid flowing through the nozzle is reduced and so is the Reynolds number Re. Therefore, when the nozzle having a smaller diameter is used, the condition of not causing a turbulent flow can be created even in the case of the depth H=2 mm. Accordingly, the depth size needs to be set as appropriate depending on the setting values, e.g., the diameter of the nozzle used. On the other hand, in the case of the depth H=4 mm or more, the range of the nozzle diameter usable without causing a turbulent flow is increased. Hence, by setting the depth to be H=4 mm or more in design of the liquid reservoir chamber 83, the machining head can be given with wider versatility.

[Distribution of Liquid Flow Speed in Liquid Reservoir Chamber According to Embodiment]

As described above, in the laser machining apparatus of this embodiment, the average flow speed in the liquid reservoir-chamber 83 is much slower than that in the apparatus described in Patent Document 1.

By utilizing a fluid simulation based on numerical calculations, a distribution of the flow speed in the liquid reservoir chamber 83 according to this embodiment is now compared in more detail with that in the liquid supply passage of the known structure. Note that the liquid supply passage of the known structure described in Patent Document 1 significantly differs from the liquid reservoir chamber 83 according to this embodiment in that the depth of the liquid supply passage in the axial direction of the nozzle is smaller than the depth of the liquid reservoir chamber 83 according to this embodiment.

Figure 10:
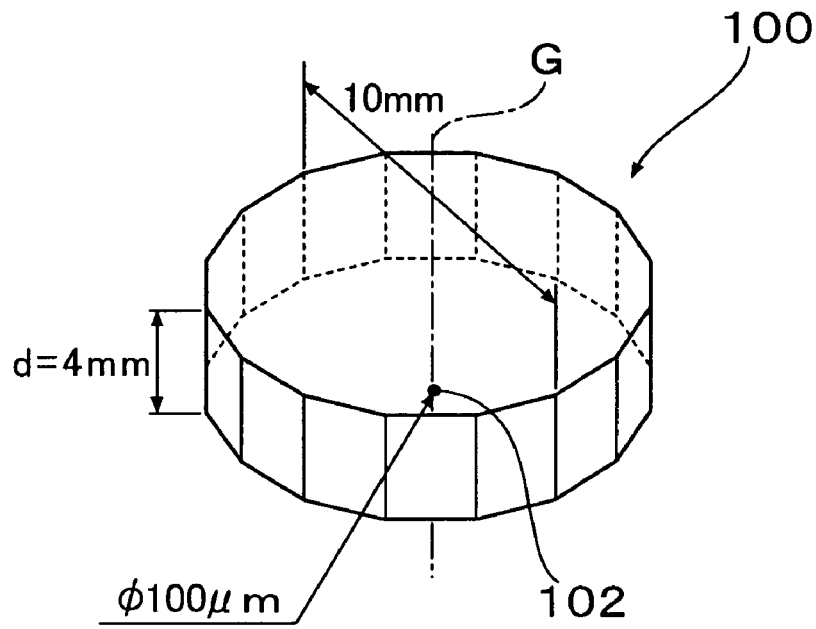
FIG. 10 illustrates a model of the liquid reservoir chamber, which is used for calculating a flow speed distribution in the liquid reservoir chamber according to the embodiment of the present invention.

FIG. 10 illustrates a model 100 of the liquid reservoir chamber 83, which is used for calculating the flow speed distribution in the liquid reservoir chamber 83 according to the embodiment. The model 100 is formed substantially in a circular cylindrical shape with a diameter of 10 mm and a height of 4 mm, and a hole 102 having a diameter of 100 μm is formed at the center of a bottom surface of the model 100 corresponding to the nozzle 3. The simulation for the flow speed distribution has been performed on condition that the fluid uniformly flows into the model 100 at a speed of 6.25 mm/s from a peripheral surface of the model 100 and uniformly flows out from the hole 102 at a speed of 100 m/s.

Figure 11:
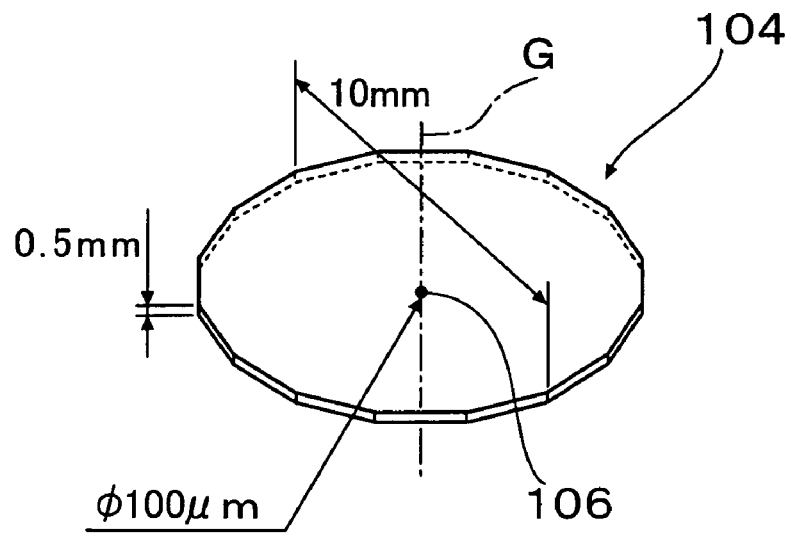
FIG. 11 illustrates a model of a liquid supply passage, which is used for calculating a flow speed distribution in the liquid supply passage of the known structure.

On the other hand, FIG. 11 illustrates a model 104 of the liquid supply passage, which is used for calculating the flow speed distribution in the liquid supply passage of the known structure. The model 104 is formed substantially in a circular cylindrical shape with a diameter of 10 mm and a height of 0.5 mm, and a hole 106 having a diameter of 100 μm is formed at the center of a bottom surface of the model 104 corresponding to the nozzle. The simulation for the flow speed distribution has been performed by setting the inflow speed from a peripheral surface of the model 104 to 50 mm/s so that the outflow speed of the fluid from the hole 106 becomes 100 m/s, i.e., the same value as that under the calculation conditions in this embodiment.

Figure 12:
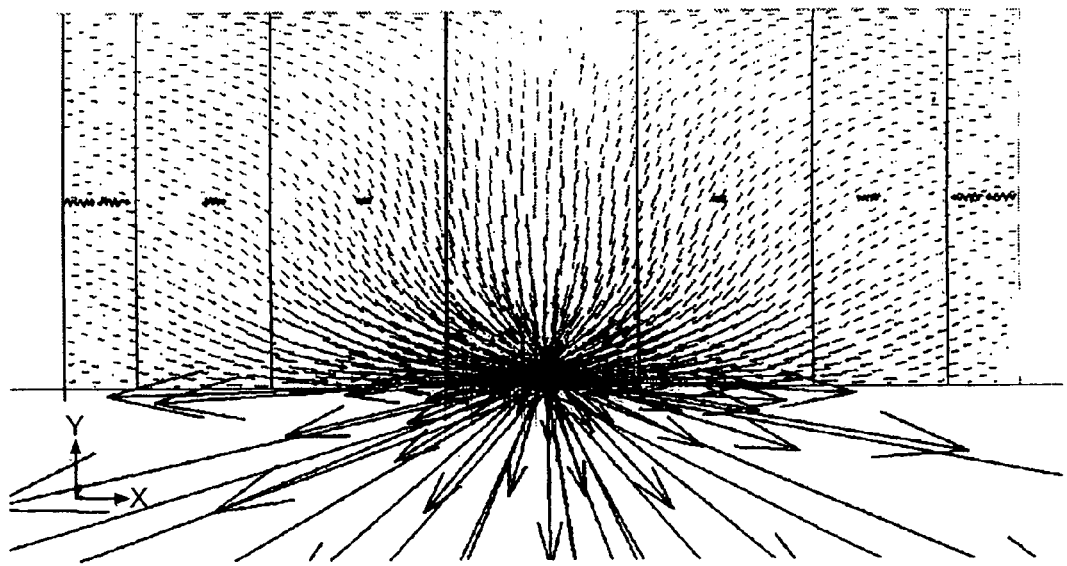
FIG. 12 illustrates, using a vector, the flow speed at each point within the liquid reservoir chamber.
Figure 13:
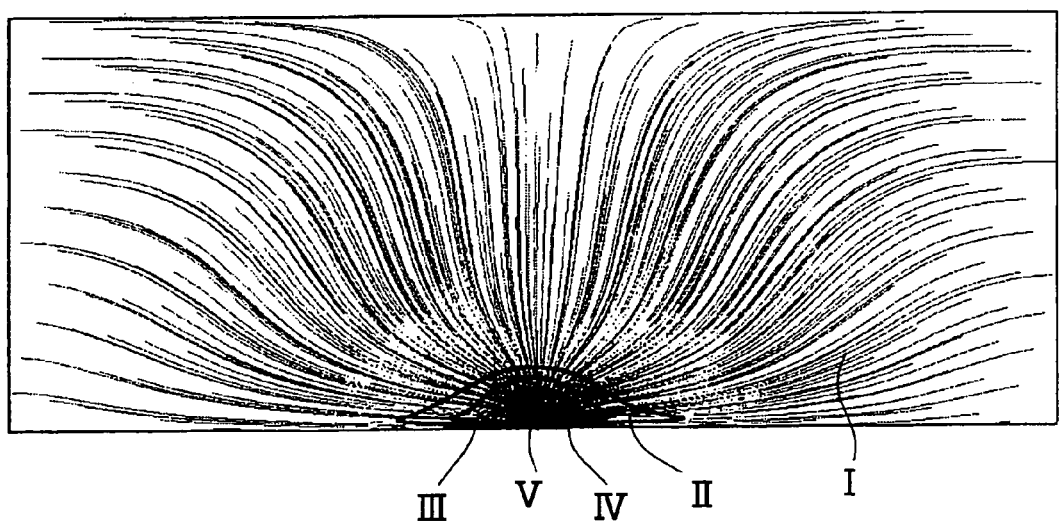
FIG. 13 illustrates a space within the liquid reservoir chamber, which is divided per zone where the flow speed is substantially the same.
Figure 14:
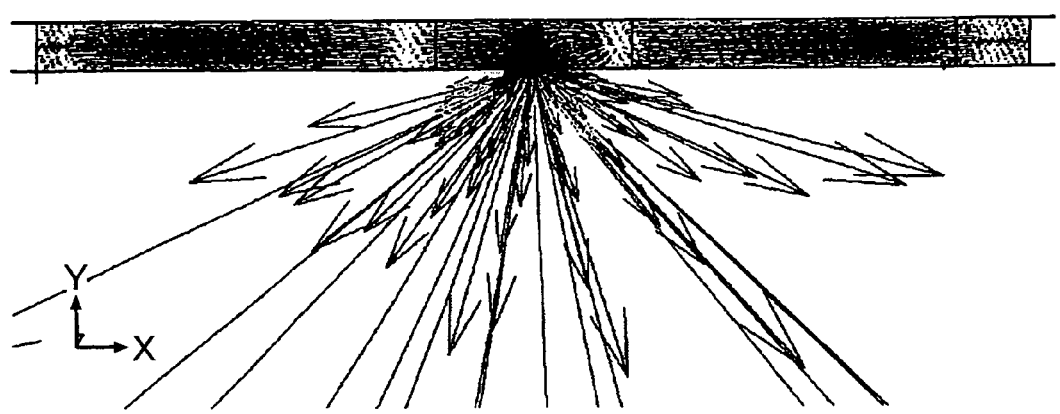
FIG. 14 illustrates, using a vector, the flow speed at each point within the liquid supply passage.
Figure 15:
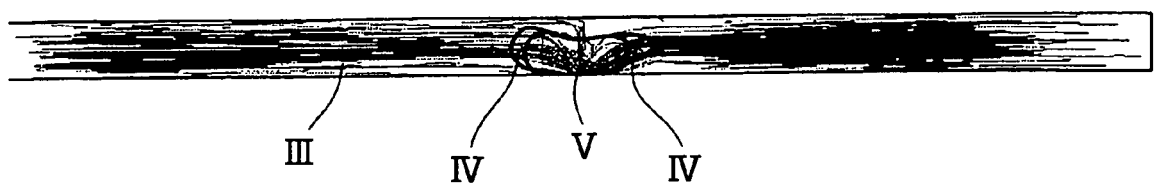
FIG. 15 illustrates a space within the liquid supply passage, which is divided per zone where the flow speed is substantially the same.

FIGS. 12 and 13 illustrate the simulation results of the water flow speed distribution when the model 100 representing the liquid reservoir chamber according to this embodiment is used. FIGS. 14 and 15 illustrate the simulation results of the water flow speed distribution when the model 104 representing the liquid supply chamber described in Patent Document 1. Of those drawings, FIGS. 12 and 14 indicate respectively the flow speed distributions in cross-sections taken along axes of the holes in the two models. In FIGS. 12 and 14, the flow speed at each point in the models 100 and 104 is represented by the direction and the magnitude of a vector extending from the point. A larger length of the vector means a larger flow speed. FIGS. 13 and 15 illustrate not only stream lines of the liquid within the liquid reservoir chamber and the liquid supply passage, but also the flow speed distributions in each of roughly divided zones where the flow speed is substantially the same. In FIGS. 13 and 15, a zone I represents a region where the flow speed is about 0.125 m/sec or lower, a zone II represents a region where the flow speed is about 0.125 to 0.25 m/sec, and a zone III represents a region where the flow speed is about 0.25 to 0.75 m/sec. A zone IV represents a region where the flow speed is about 0.75 to 0.875 m/sec, and a zone V represents a region where the flow speed is about 0.875 m/sec or higher. Note that, in FIG. 15, the region where the flow speed is about 0.25 m/sec or lower (i.e., the zones I and II) hardly appear.

As shown in FIGS. 12 and 13, in the model 100 representing this embodiment, movement of the water is small and the flow speed of the water is also small other than the vicinity of the hole 102. Further, the flow speed is very small in a large region above the hole 102.

On the other hand, as shown in FIGS. 14 and 15, in the model 104 representing the liquid supply passage described in Patent Document 1, the flow speed of the water is larger than that in the model 100 over the entire liquid supply passage. In particular, it is confirmed that, in a region above the hole 106, the flow speed is quite larger up to an upper end of the liquid supply passage. Also, the water flow is moved from the outer peripheral side spaced from the hole 106 toward the hole 106 at the center in a direction perpendicular to the axial direction of the hole 106, and the flow direction is abruptly changed above the hole 106 from the direction perpendicular to the axial direction of the hole 106 toward the axial direction of the hole 106.

From the above description, it is understood that, by setting, as in the liquid reservoir chamber 83 according to this embodiment, the height of the circular cylinder corresponding to each of the models 100 and 104, i.e., the depth of the liquid reservoir chamber (liquid supply passage) in the direction of the axis G of the nozzle 3, to be larger than that in the known structure, the water can be caused to flow through the liquid reservoir chamber 83 in such a manner as reducing the water flow speed in the liquid reservoir chamber 83 in comparison with that in the known structure. Consequently, the laminar state can be formed in the liquid reservoir chamber 83 upstream of the nozzle 3, and disturbances can be effectively avoided from generating at the surface of the jet liquid column F ejected from the nozzle 3.

[Distribution of Turbulence Energy of Liquid in Liquid Reservoir Chamber According to Embodiment]

Next, turbulence energy within the liquid reservoir chamber 83 according to this embodiment is compared with that within the liquid supply passage of the known structure described in Patent Document 1. Herein, the term "turbulence energy" means a value calculated by dividing a time average of the sum of squares of fluctuating speed components in respective directions of the turbulent flow by 2, i.e., a degree of flow turbulence.

Based on each of the above-described models 100 and 104 shown in FIGS. 10 and 11, the distribution of the turbulence energy in a plane perpendicular to the axis of the circular cylinder is calculated at a distance of 0.01 mm from the surfaces in which the holes 102 and 106 are formed, by utilizing a numerical fluid simulation.

Figure 16:
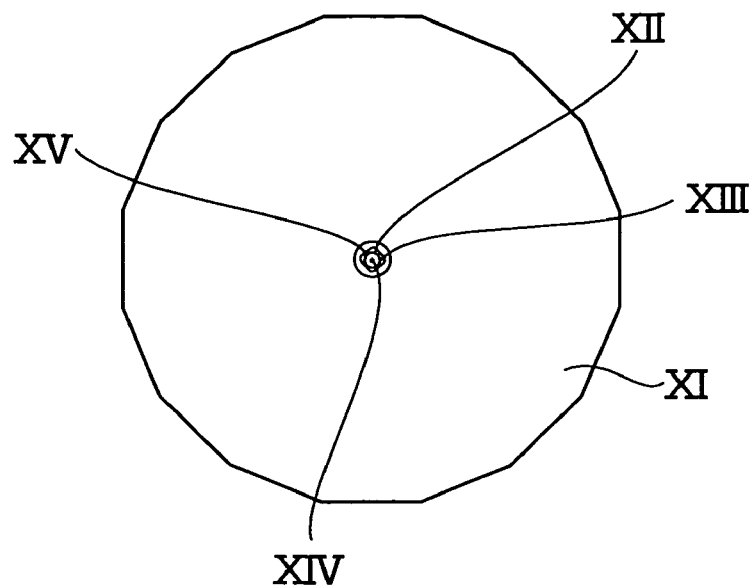
FIG. 16 illustrates the simulation result of a distribution of turbulence energy in the model representing the liquid reservoir chamber according to the embodiment.
Figure 17:
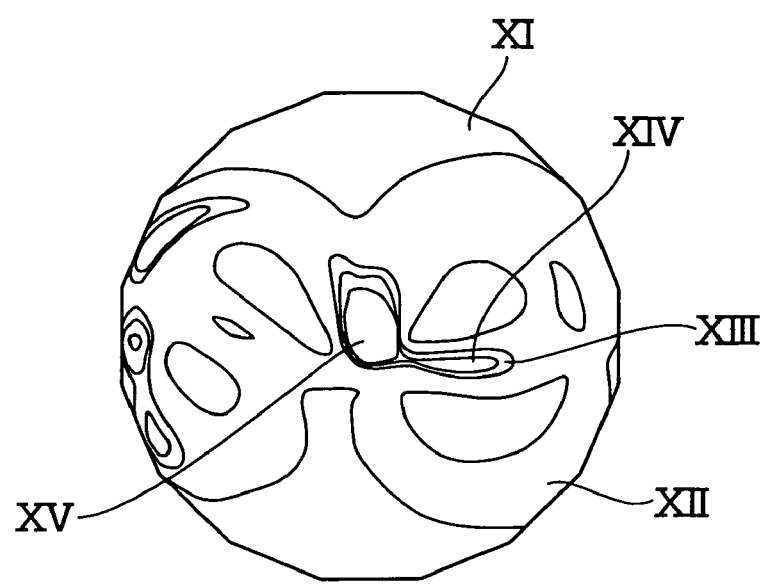
FIG. 17 illustrates the simulation result of a distribution of turbulence energy in the model representing the liquid supply passage of the known structure.

FIG. 16 illustrates the simulation result of the distribution of turbulence energy in the model 100 representing to the liquid reservoir chamber 83 according to the embodiment, and FIG. 17 illustrates the simulation result of the distribution of turbulence energy in the model 104 representing the liquid supply passage of the known structure. In each of FIGS. 16 and 17, a value of the turbulence energy is increased in the order of zones XI, XII, XIII, XIV and XV.

As shown in FIG. 16, the turbulence energy in the model 100 uniformly has a low value substantially over the entire region except for the vicinity of the hole 102, and the zones where the turbulence energy is relatively high appear symmetrically substantially in a circular shape in the vicinity of the hole 102.

On the other hand, as shown in FIG. 17, the turbulence energy in the model 104 has a higher value than that in FIG. 16 over a wide region around the hole 106, and the distribution of the turbulence energy appears asymmetrically. Stated another way, the flow in the model 104 is not uniform and an uneven flow (disturbance), such as entanglement, is generated.

From the above description, it is understood that, in the model 100 representing the liquid reservoir chamber 83 according to this embodiment, a liquid flow can be produced which is uniform in the direction perpendicular to the axis G of the liquid reservoir chamber 83 and which is less turbulent, by setting the height H of the liquid reservoir chamber 83, i.e., the depth of the liquid reservoir chamber 83 in the direction of the axis G of the nozzle 3, to a larger value than that in the known structure.

Further, maximum values of the turbulence energy in respective flow fields of the models 100 and 104, shown in FIGS. 10 and 11, are 124 $m^2/s^2$ in the model 100 shown in FIG. 10 and 307 $m^2/s^2$ in the model 104 shown in FIG. 11. From those maximum values, it is also understood that the structure of the liquid reservoir chamber 83 according to this embodiment, which corresponds to the model 100, can more effectively suppress the generation of turbulent flows than the known structure which corresponds to the model 104.

[Water Movement Path near Nozzle in Embodiment]

Next, a water movement path near the nozzle in this embodiment is compared with that near the nozzle in the known structure based on experiments.

To actually confirm the above-described simulation results shown in FIGS. 12 to 17, actual models similar to those shown in FIGS. 10 and 11 were fabricated. Water mixed with paint particles, as observation particles, was supplied to flow through the fabricated models and images of the paint particles were shot by a high-speed video camera. At that time, the diameter of the hole corresponding to the nozzle was set to 200 µm, the water jet pressure was set to 2 MPa, and the diameters of the paint particles were set to 20 to 60 µm. Further, shooting conditions of the high-speed video camera were set such that the video camera was Photoron FAST-CAM-MAX model 120k, the number of shot frames was 6000 fps for the model of FIG. 10, and the number of shot frames was 4000 fps for the model of FIG. 11.

Figure 18:
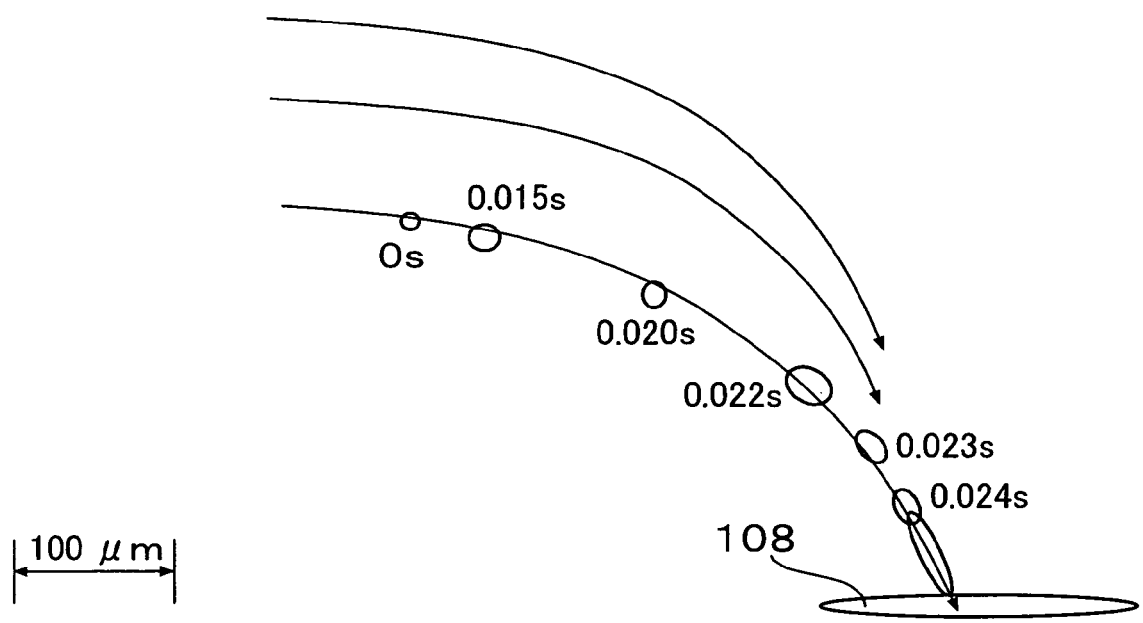
FIG. 18 illustrates movement of a fluid in the model representing the structure of the liquid reservoir chamber according to the embodiment.
Figure 19:
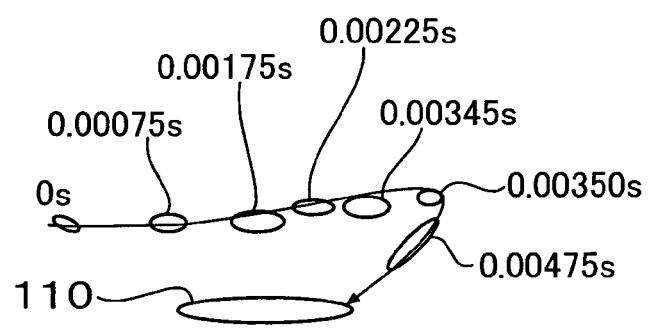
FIG. 19 illustrates movement of a fluid in the model representing to the known structure of the liquid supply passage.
Figure 19:
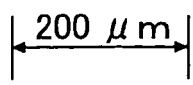

FIG. 18 illustrates an image resulting from shooting movement of the water in the actual model shown in FIG. 10, which represents the structure of the liquid reservoir chamber 83 according to the embodiment, and FIG. 19 illustrates movement of the water in the actual model shown in FIG. 11, which represents the known structure of the liquid supply passage. Note that, in each of FIGS. 18 and 19, the movement path of the observation particle is represented by superimposing images of the observation particle taken at different times.

As shown in FIG. 18, in the model representing the structure of the liquid reservoir chamber 83 according to this embodiment, the observation particle is moved toward a hole 108 from above the hole 108 while drawing an undisturbed stream line as indicated by an arrow.

On the other hand, as shown in FIG. 19, in the model representing the known structure, the observation particle is moved toward a hole 110 while turning around, i.e., causing an eddy flow.

Those movements of the observation particles also coincide with the above-described simulation results shown in FIGS. 16 and 17.

From the above description, it is understood that, in the structure of the liquid reservoir chamber 83 according to this embodiment, the water can be prevented from swirling with entanglement and can be flown into the nozzle in a uniform stream by setting the depth in the direction of the nozzle axis G to be larger than that in the known structure.

[Thermal Influence of Laser Beam upon Water in Embodiment]

Next, the thermal influence of the laser beam traveling in water upon the water will be described in connection with the cases of using a fundamental wave with a wavelength of 1064 nm, which is employed in the apparatus of Patent Document 1, and a second harmonic wave with a wavelength of 532 nm, which is employed in the laser machining apparatus of this embodiment.

First, a temperature rise of the water caused by absorbing the laser beam is compared between an IR laser and a green laser.

Figure 20A:
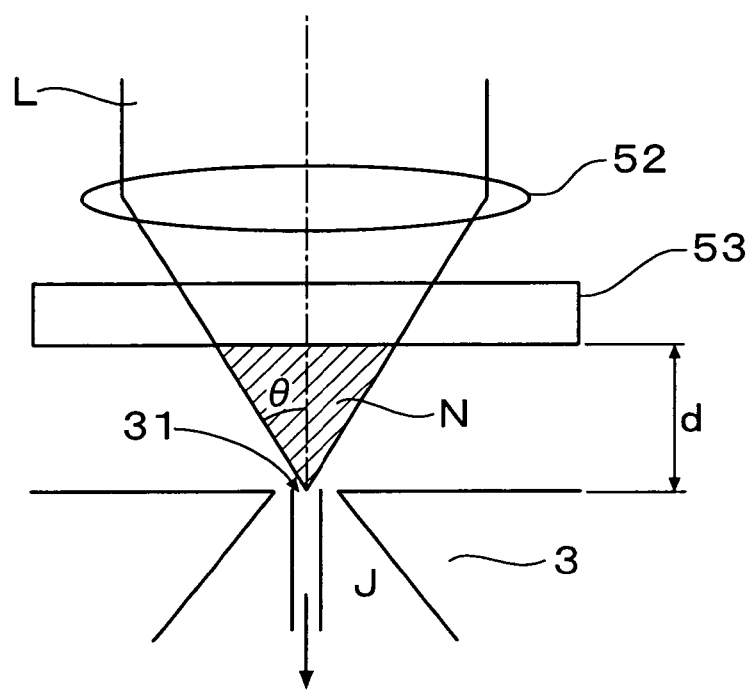
FIGS. 20A and 20B are schematic views showing a conical region irradiated with the laser beam above the nozzle.

FIG. 20A is a schematic view showing a region near the nozzle 3. As shown in FIG. 20A, the laser beam L is condensed by the condensing lens 52 and passes the guide window 53. Further, the laser beam L advances through the water in the liquid reservoir chamber 83 and is focused at the inlet opening 31 of the nozzle 3. Accordingly, a region N where the water in the liquid reservoir chamber 83 is irradiated with the laser beam L has a conical shape. Therefore, a temperature rise of the water in the conical region N is calculated.

Figure 20B:
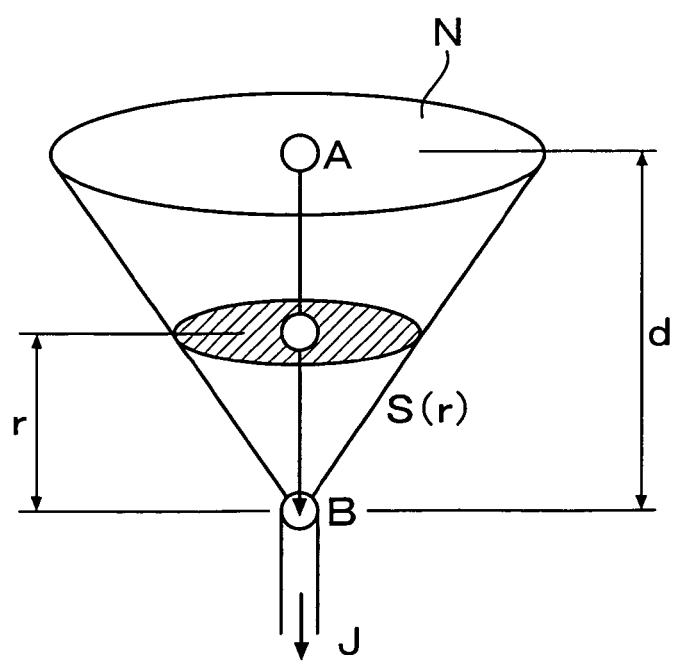

FIG. 20B is a schematic view showing the conical region N irradiated with the laser beam L. In FIG. 20B, a temperature rise ΔT of the water in the conical region N ranging from a point A corresponding to the center of a bottom surface of the conical region N to an apex B which is spaced from the point A by a distance d and which corresponds to the position of the inlet opening 31 of the nozzle 3 is determined by the following formula 5.

$$\Delta T = \frac{P\alpha}{\rho C} \int \frac{1}{S(r)} \frac{dt}{dr} dr \qquad \text{(Formula 5)}$$
$$= \frac{P\alpha}{\rho C} \int \frac{2}{J\tan^2\theta} dr$$
$$= \left[\frac{2P\alpha}{\rho C J\tan^2\theta} r\right]$$
$$= \frac{2P\alpha d}{\rho C J\tan^2\theta}$$

In the formula 5, P is the output (W) of the laser beam, and α is the absorption coefficient (cm⁻¹) of the laser beam against water. The IR laser has $\alpha_{FM}=1.44\times10^{-1}$, and the green laser has $\alpha_{SHG}=4.47\times10^{-4}$. Further, d is the distance (mm) from the point A, C is the specific heat of water, i.e., 4.18 (J/g·K), p is the density of water, i.e., 1 (g·cm⁻³), J is the flow rate of water on condition of the nozzle diameter being 150 μm and the jet pressure being about 4 MPa, i.e., 1.7 (cm³/sec), and θ is the angle of a peripheral surface of the conical region N with respect to the axis G, i.e., tan θ=0.1, as shown in FIG. 20A.

Figure 21:
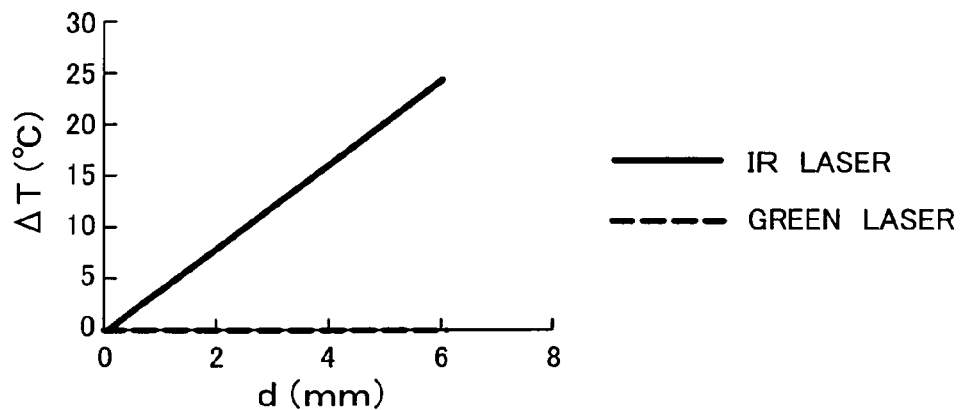
FIG. 21 is a graph showing a temperature rise $\Delta T$ of water, which is caused by absorbing the laser beam, with respect to a distance d from a point A in the case of an output P=10 (W).

FIG. 21 is a graph showing the temperature rise ΔT of water, which is caused by absorbing the laser beam L, with respect to the distance d from the point A to B in the case of the output P=10 (W). As shown in FIG. 21, when the IR laser is irradiated, the water temperature rises in proportion to an increase of the distance d. At the distance d of 4 mm, the temperature rise ΔT is 16.2° C. On the other hand, when the green laser is irradiated, the water temperature hardly rises even with an increase of the distance d. At the distance d of 4 mm, the temperature rise ΔT is 0.05° C. On that occasion, a refractivity change Δn due to the temperature rise of water is $\Delta n_{FM}=1.3\times10^{-3}$ in the case of the IR laser, and it is $\Delta n_{SHG}=-4\times10^{-6}$ in the case of the green laser. It is hence understood that, when the green laser is used, the refractivity is not greatly changed and the thermal influence upon transmission of the laser beam is hardly caused unlike the case of using the IR laser.

In order to, when the IR laser is used, reduce the temperature rise to be comparable to that in the case of the green laser, the distance d from the point A to B needs to be set to about 13 μm. However, if the distance d from the point A to B is set to such a small value, flow disturbances are generated in the liquid reservoir chamber 83 as described above. This also proves that using the green laser is more advantageous in minimizing the thermal influence while enabling the jet liquid column to be formed without disturbances.

Thus, when the green laser is used, the water temperature hardly rises even with the distance d set to 4 mm and the influence of a thermal lens due to a change in the refractivity of water, which is caused with the temperature rise, can be suppressed much more significantly than when the IR laser is used. Further, when the green laser is used, the thermal influence in the conical region N is so small that there is no need of setting the water flow speed to a large value with intent to prevent the temperature rise of the water. Accordingly, the depth of the liquid reservoir chamber 83 in the direction of the axis G can be set to a larger value and the water flow speed can be reduced. It is hence possible to maintain the water in the liquid reservoir chamber 83 in the laminar state and to jet the jet liquid column F in a stable undisturbed state.

Next, a description is made on the relation of the temperature change of water with respect to the output when the IR laser and the green laser are used.

Figure 22:
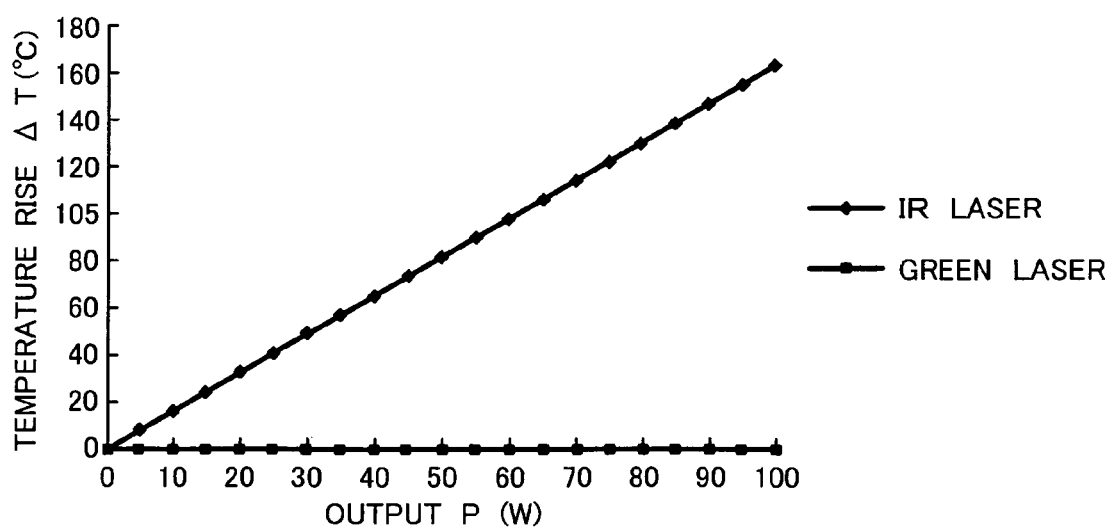
FIG. 22 is a graph showing a temperature rise $\Delta T$ of water in the conical region with respect to an output P of an IR laser and a green laser when the distance d from the point A is set to 4 mm.

FIG. 22 is a graph showing a temperature change (rise) ΔT of water in the conical region N with respect to the output P of the IR laser and the green laser when the distance d from the point A to B is set to 4 mm. It is here assumed that the nozzle diameter is 150 μm, the jet pressure is 4 MPa, and the condensing angle θ of the laser beam L is 5.7°. As shown in FIG. 22, when the IR laser is used, the temperature change ΔT of the water is increased in proportion to an increase of the output P of the laser beam L. On the other hand, when the green laser is used, the temperature change ΔT of the water hardly increases even with an increase of the output P.

From the above description, it is understood that using the green laser is more advantageous in suppressing the formation of the thermal lens in terms of not only the distance d, but also the output P of the laser beam than the case of using the IR laser.

Figure 23:
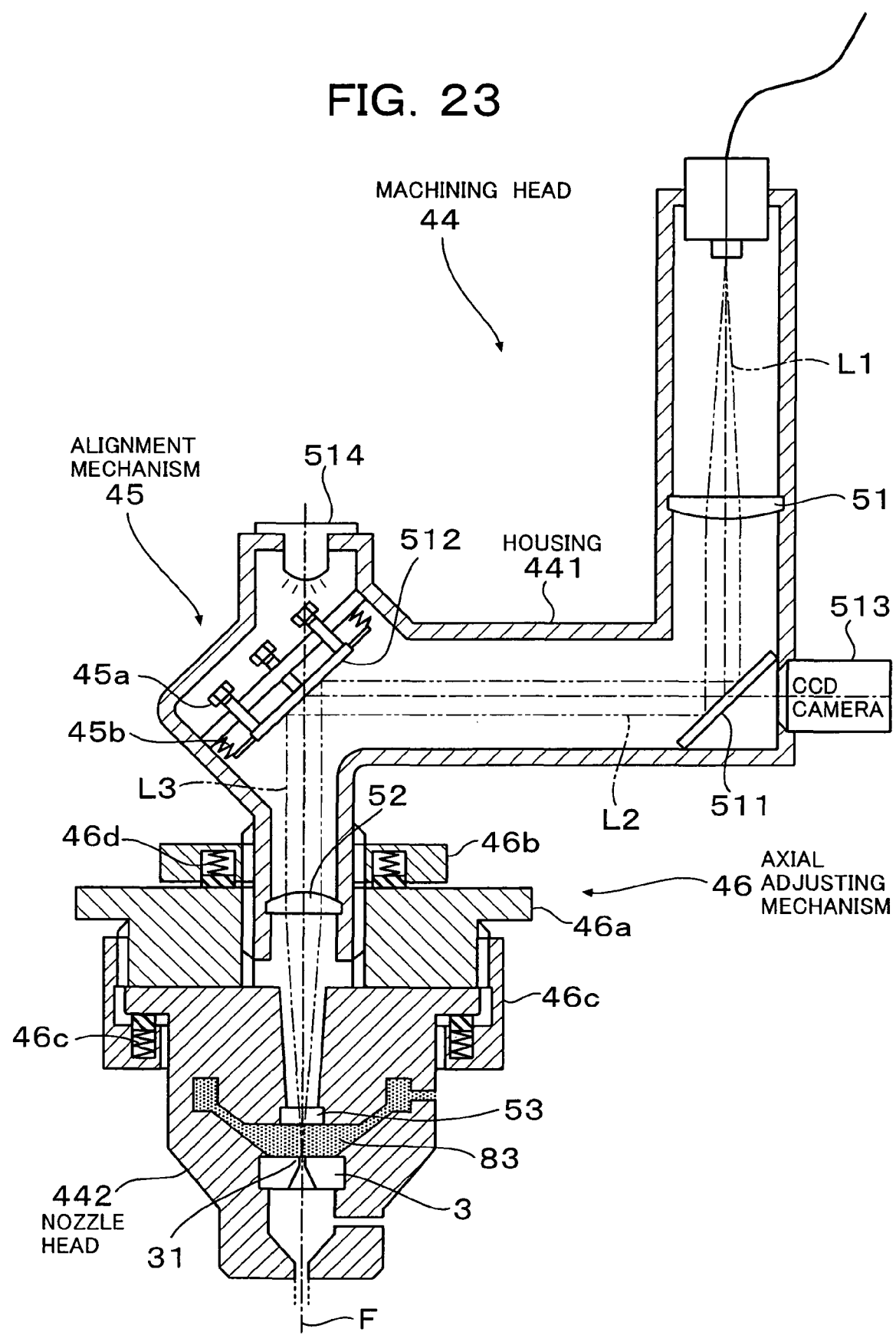
FIG. 23 is a side sectional view showing the construction of a first example of a machining head according to the embodiment of the present invention.

Next, a first example of the machining head according to the embodiment of the present invention will be described with reference to FIG. 23. FIG. 23 is a side sectional view showing the construction of the first example of the machining head according to the embodiment of the present invention.

Note that the same components in FIG. 23 as those in the machining head 4 according to the above-described embodiment are denoted by the same reference characters, and a detailed description of those components is omitted here.

A machining head 44 of the first example comprises, as shown in FIG. 23, an alignment mechanism 45 for properly positioning a center axis of the laser beam L, and an axial adjusting mechanism 46 for adjusting the height of a focused point of the laser beam L in the axial direction.

In the machining head 44, a housing 441 containing the optical device 5 has a bent crank-like shape, and a nozzle head 442 is mounted to a distal end of the housing 441 through the axial adjusting mechanism 46. A laser beam L1 radiated downward from a top of the machining head 44 is horizontally reflected by a beam splitter 511. A laser beam L2 thus horizontally reflected is reflected again downward parallel to the laser beam L1 by a beam splitter 512. A laser beam L3 thus reflected downward is condensed by the condensing lens 53 to be focused at the inlet opening 31 of the nozzle 3.

The beam splitters 511 and 512 have the function of reflecting the laser beam L such that visible light other than the vicinity of green passes through the beam splitters. A CCD camera 513 is disposed behind (on the right side as viewed in FIG. 23) the beam splitter 511, and an LED light 514 serving as a light source is disposed behind (on the upper side as viewed in FIG. 23) the beam splitter 512.

With such a construction, the inlet opening 31 of the nozzle 3 can be illuminated by the LED light 514, and the focus position of the laser beam L can be confirmed by the CCD camera 513.

The alignment mechanism 45 includes adjusting screws 45a arranged at three positions that are orthogonal to one another on a circle, and springs 45b for holding the beam splitter 512. An angle of the beam splitter 512 can be adjusted by pushing and pulling the adjusting screws 45a.

With such a construction, the position of the center axis of the laser beam L can be aligned with the inlet opening 31 of the nozzle 3 by adjusting the angle of the beam splitter 512 with the adjusting screws 45a while confirming the focus position of the laser beam L at the inlet opening 31 of the nozzle 3 by the CCD camera 513.

The axial adjusting mechanism 46 includes an adjusting nut 46a for holding the nozzle head 442 screwed to the distal end of the housing 441, a lock nut 46b for holding the adjusting nut 46a at the upper side thereof which is screwed to the distal end of the housing 441, and a lock nut 46c for holding the screwed nozzle head 442 over an outer peripheral portion of the adjusting nut 46a. Springs 46d and 46e are built respectively in the lock nuts 46b and 46c to bias them in the axial direction so as to remove backlashes.

With such a construction, by rotating the adjusting nut 46a in a state where the lock nuts 46b and 46c are loosened, the axial position of the nozzle head 442 can be adjusted so that the axial height of the focus point of the laser beam L can be aligned with the inlet opening 31 of the nozzle 3. Further, since the nozzle head 442 is firmly fixed by the lock nuts 46b and 46c and backlashes are removed by the provision of the springs 46d and 46e, a structure durable against vibrations and impacts can be obtained. Accordingly, the laser beam L can be stably and efficiently introduced into the jet liquid column F.

Figure 24A:
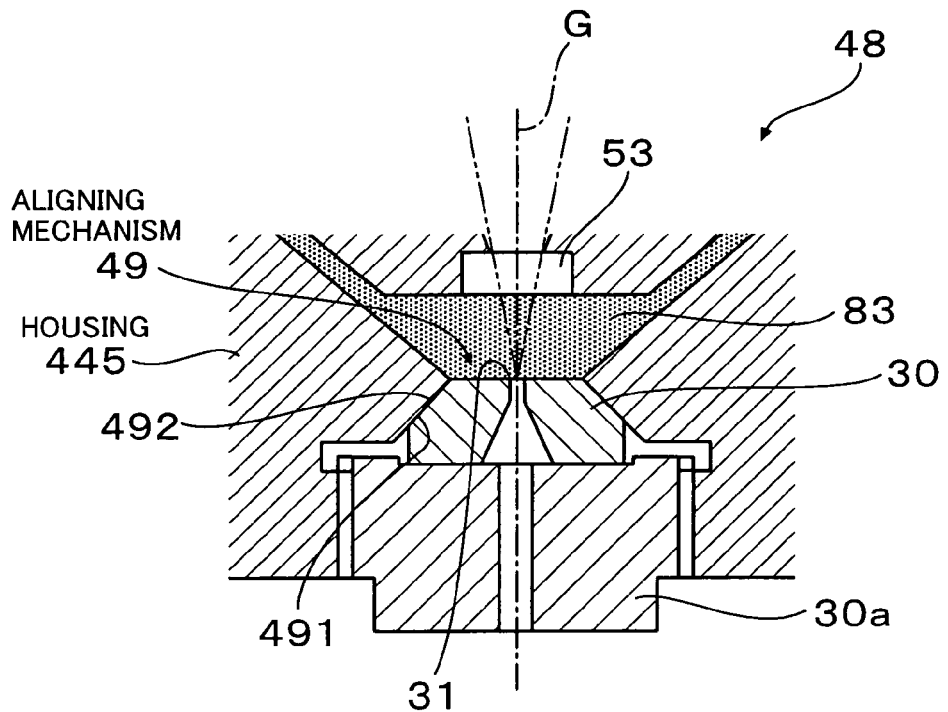
FIG. 24A is a partial side sectional view showing the construction around the nozzle in a second example of the machining head according to the embodiment of the present invention, and FIG. 24B illustrate the case where a sealing member is disposed in the construction of FIG. 24A.

A second example of the machining head according to the embodiment of the present invention will be described with reference to FIGS. 24A and 24B. FIG. 24A is a partial side sectional view showing the construction around the nozzle in the second example of the machining head according to the embodiment of the present invention, and FIG. 24B illustrate the case where a sealing member is disposed in the construction of FIG. 24A.

Figure 24B:
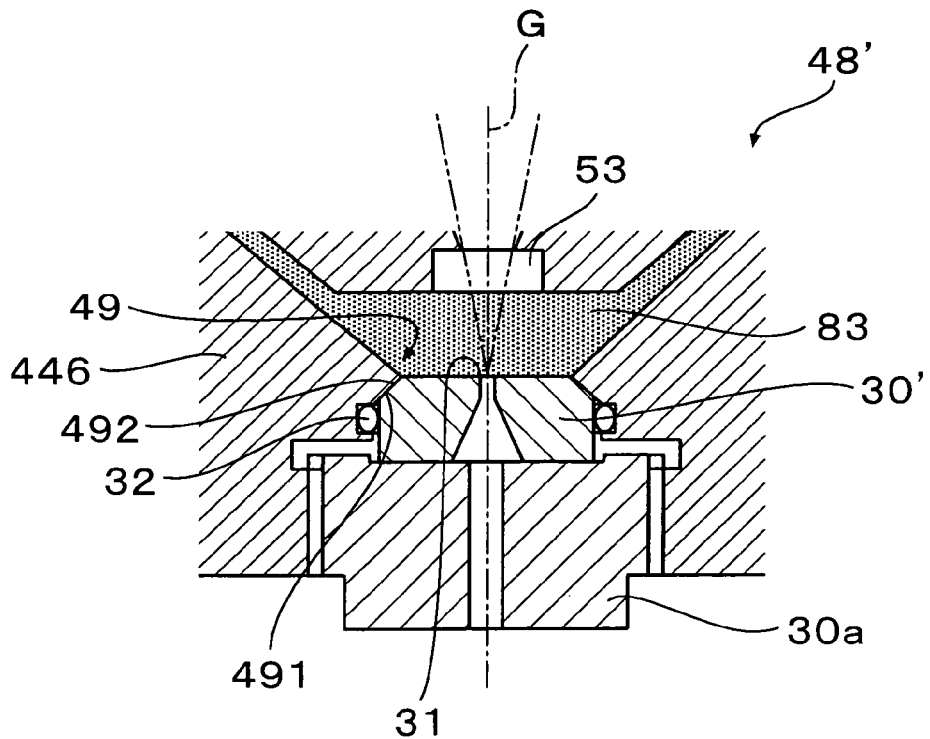

Note that the same components in FIGS. 24A and 24B as those in the machining head 4 according to the above-described embodiment are denoted by the same reference characters, and a detailed description of those components is omitted here.

Each of machining heads 48 and 48' of the second example, shown in FIGS. 24A and 24B, includes an aligning mechanism 49 for aligning a center axis of a corresponding housing 445 or 446 with the axis G of the nozzle.

As shown in FIGS. 24A and 24B, the aligning mechanism 49 is constructed such that the center axis of the housing 445 or 446 is automatically aligned with the axis G of the nozzle by engaging a tapered portion 491 formed on the nozzle side with a complementary tapered portion 492 formed on the housing side. Further, by screwing a nozzle cap 30a to each of the housing 445 and 446, the nozzles 30 and 30' can be fixed to the housings 445 and 446, respectively.

Further, in the machining head 48', an O-ring 32 as a sealing member is disposed over an outer peripheral surface of the nozzle 30', as shown in FIG. 24B, to thereby increase sealability.

Thus, with the provision of the aligning mechanism 49 having the above-described construction, the nozzles 30 and 30' can be stably held in place. It is also possible to solve the problem that, whenever the nozzles 30 and 30' are replaced, the center position and perpendicularity of each nozzle 30, 30' is deviated and the jet liquid column F cannot be held stable.

Further, with the provision of the nozzle cap 30a for fixing the nozzles 30 and 30' to the housings 445 and 446, respectively, operations of replacing the nozzles 30 and 30' can be facilitated.

Figure 25:
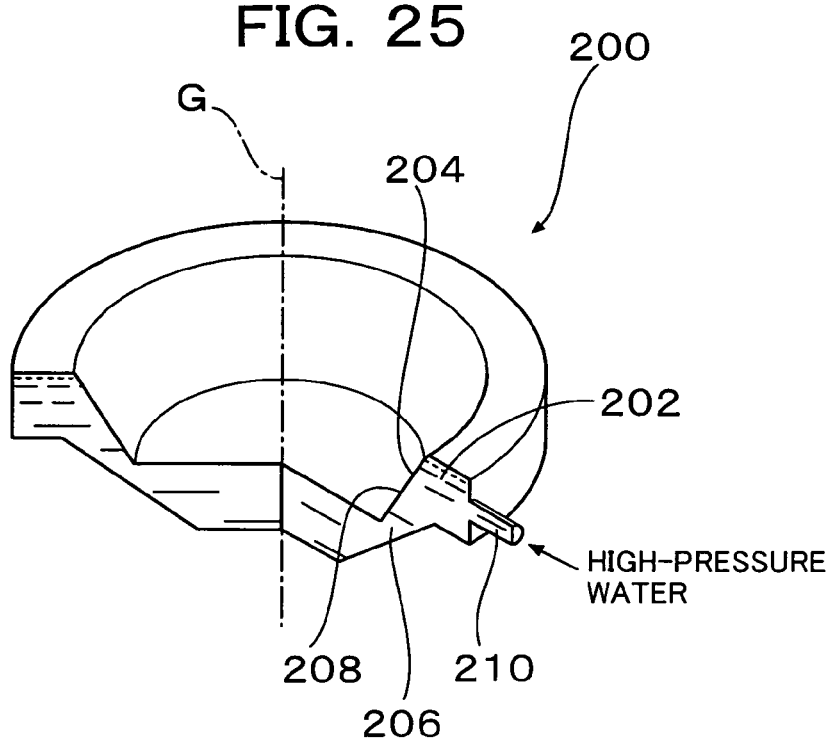
FIG. 25 is a perspective view showing the shape of a first modification of the laminar flow forming channel according to the embodiment of the present invention.
Figure 26:
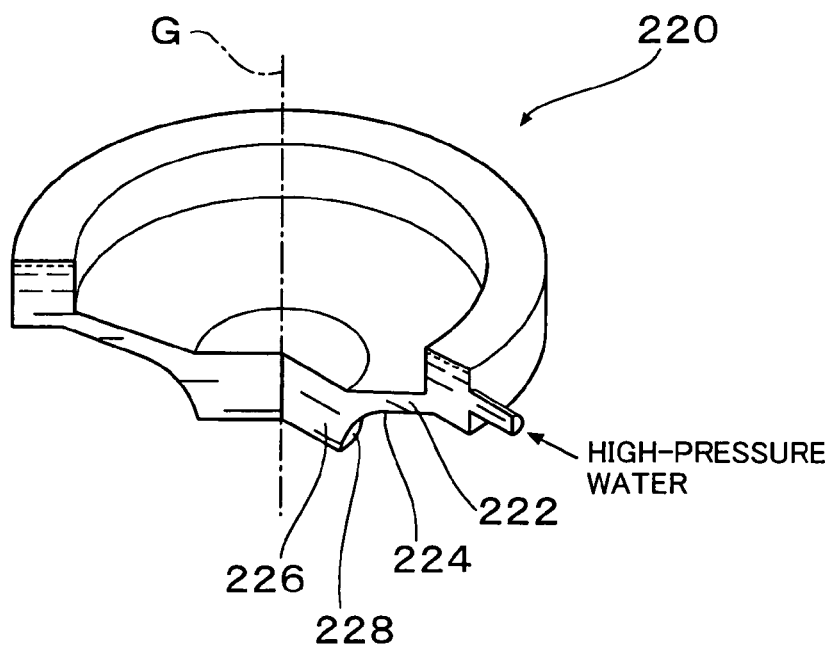
FIG. 26 is a perspective view showing the shape of a second modification of the laminar flow forming channel according to the embodiment of the present invention.
Figure 27:
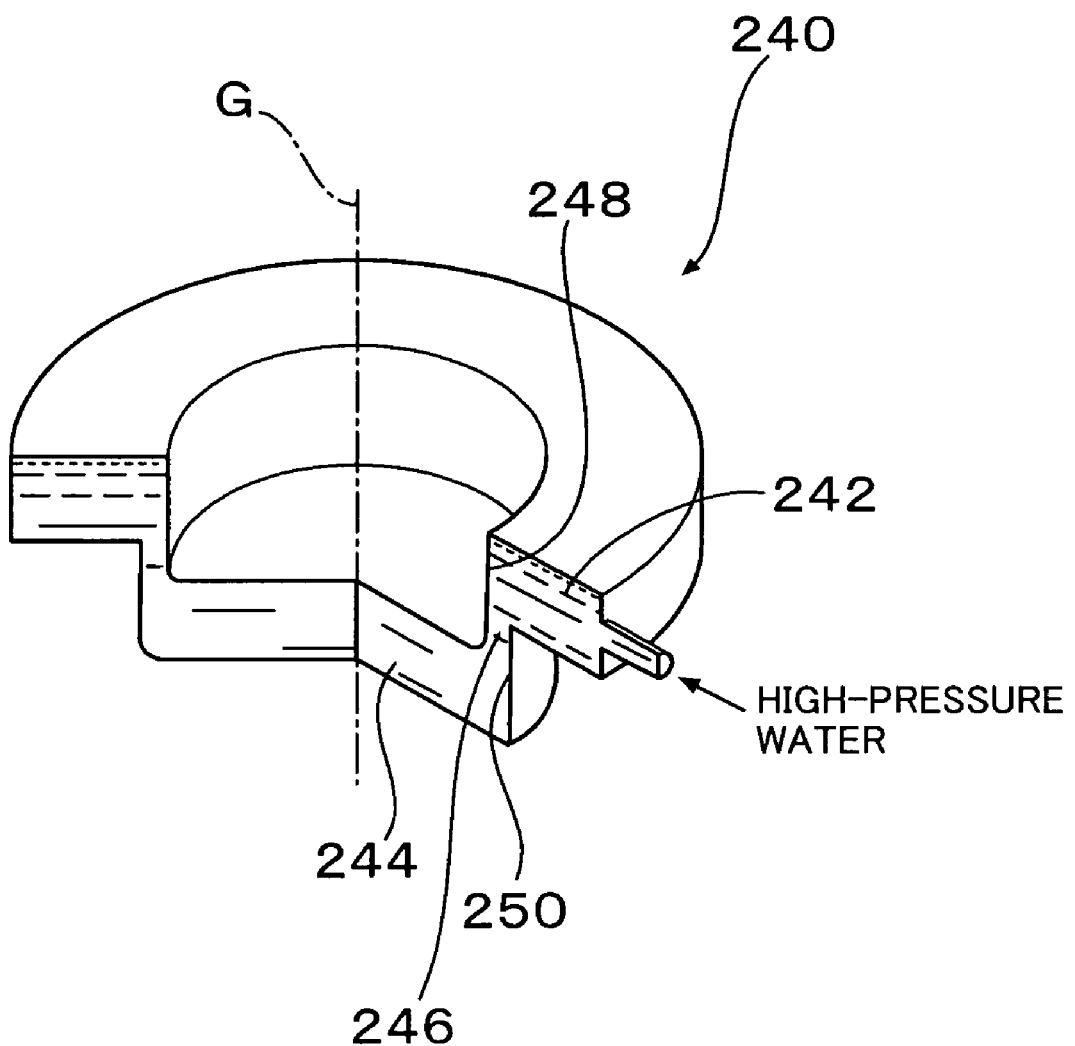
FIG. 27 is a perspective view showing the shape of a third modification of the laminar flow forming channel according to the embodiment of the present invention.

Next, modifications of the laminar flow forming channel according to the present invention will be described with reference to FIGS. 25 to 27. FIG. 25 is a perspective view showing the shape of a first modification of the laminar flow forming channel according to the embodiment of the present invention. FIG. 26 is a perspective view showing the shape of a second modification of the laminar flow forming channel according to the embodiment of the present invention. FIG. 27 is a perspective view showing the shape of a third modification of the laminar flow forming channel according to the embodiment of the present invention.

In a laminar flow forming channel 200 of the first modification, as shown in FIG. 25, an inner peripheral wall surface 204 of a distribution channel 202 is formed as an inclined surface that is inclined inward and downstream in the direction of the axis G. Similarly, an inner peripheral surface 208 of an interconnecting channel 206 is formed as an inclined surface that is also inclined inward and downstream in the direction of the axis G. The inner peripheral surface 208 and the inner peripheral wall surface 204 form a continuous surface on the same plane. When the high-pressure water is introduced to the thus-shaped laminar flow forming channel 200 from the high-pressure pump through the guide pipe 210, the water flows into the interconnecting channel 206 while being guided by the inclined inner peripheral wall surface 204 of the distribution channel 202 and the inclined inner peripheral surface 208 of the interconnecting channel 206. Accordingly, the water can smoothly flow in the laminar flow forming channel 200 and the generation of turbulent flows and eddies can be more positively suppressed.

In a second modification shown in FIG. 26, an outer peripheral surface 224 of an interconnecting channel 222 of a laminar flow forming channel 220 and an outer peripheral surface 228 of a liquid reservoir chamber 226 thereof are both curved inward in an arc-shape. Thus, in the second modification, the outer peripheral surface 224 of the interconnecting channel 222 and the outer peripheral surface 228 of the liquid reservoir chamber 226 form a continuously curved surface. With the laminar flow forming channel 220 thus shaped, the water can smoothly flow from the interconnecting channel 222 to the liquid reservoir chamber 226, and the generation of turbulent flows and eddies can be more positively suppressed.

In a third modification shown in FIG. 27, a distribution channel 242 and a liquid reservoir chamber 244 of a laminar flow forming channel 240 are each formed to have a substantially rectangular cross-sectional shape. An interconnecting channel 246 of the laminar flow forming channel 240 is formed to extend in the direction of the axis G so that an inner portion of the distribution channel 242 on the downstream side in the direction of the axis G is communicated with an outer portion of the liquid reservoir chamber 244 on the upstream side in the direction of the axis G. With the laminar flow forming channel 240 thus shaped, water having flown into the distribution channel 242 strikes against an inner peripheral wall surface 248 thereof and spreads over an entire circumference of the distribution channel 242. After changing a flow direction downward in the direction of the axis G, the water advances along the inner peripheral surface 248 and flows into the interconnecting channel 246. Further, the water flows from the interconnecting channel 246 into the liquid reservoir chamber 244 along its outer peripheral wall surface 250. In other words, with the laminar flow forming channel 240 thus shaped, since the water moves along the inner peripheral wall surface 248 of the distribution channel 242 and the outer peripheral wall surface 250 of the liquid reservoir chamber 244, the generation of water eddies on the wall surfaces is suppressed. The laminar flow forming channel 240 of the third modification is particularly effective when the interconnecting channel 246 cannot be formed long due to a limitation from a structural point of view.

Incidentally, the interconnecting channel is not limited to the shapes described above with reference to FIGS. 3 and 25 to 27, and it can have any desired shape so long as the shape allows the jet liquid to flow into the liquid reservoir chamber from its entire circumference.

While the embodiment of the present invention has been described above, the present invention is not limited to the above-described embodiment and can be practiced in forms variously modified as required.

For example, while the green laser is used as the laser beam L in the embodiment, the present invention is not limited to the use of the green laser. A UV laser having a shorter wavelength and being less absorbable by water can also be used as the laser beam L. Preferably, a laser beam is used which has the absorption coefficient of 0.01 [cm$^{-1}$] or less when it passes through the jet liquid.

Further, while water is used as the jet liquid in the embodiment, the present invention is not limited to the use of water. For example, silicon oil being less apt to absorb the laser beam L can also be used as the jet liquid. In addition, the laser beam L is not limited to the green laser and the UV laser, and a $CO_2$ laser and a YAG laser can also be used. When water is used as the jet liquid, it is preferable to use a laser emitting a laser beam that is less absorbable by the water. The laser beam less absorbable by the water is, e.g., a laser beam in the wavelength range of 200 to 700 nm. When a jet liquid being less apt to absorb the laser beam is used, the laser beam can be introduced with satisfactory propagation efficiency even when a $CO_2$ laser and a YAG laser is used.

What is claimed is:

1. A laser machining apparatus comprising a laser oscillator for generating a laser beam, a nozzle for ejecting a jet liquid to a workpiece, and liquid supply means for supplying the jet liquid to the nozzle, the laser beam being introduced into a jet liquid column ejected from the nozzle, the laser machining apparatus further comprising:
    a laminar flow forming channel for supplying the jet liquid to the nozzle in a laminar state,
    the laminar flow forming channel including:
    a distribution channel formed by a cavity for annually distributing the jet liquid, which is supplied from the liquid supply means, around an axis of the nozzle;
    an interconnecting channel disposed to be communicated with the distribution channel at the downstream side thereof in an axial direction of the nozzle and formed by an annular cavity around the axis of the nozzle to provide a narrower flow passage than the distribution channel; and
    a liquid reservoir chamber adjacently disposed upstream of the nozzle in the axial direction thereof and storing the jet liquid to be supplied to the nozzle,
    a depth of the liquid reservoir chamber in the direction of the nozzle axis being set to a value in the range of 2 to 40 mm, and
    the liquid reservoir chamber having an outer peripheral edge being communicated with the interconnecting channel over an entire circumference of the annular shape thereof.

2. The laser machining apparatus according to claim 1, wherein the jet liquid is water and the laser beam is a green laser or a UV laser, the laser beam having an absorption coefficient of 0.01 [cm$^{-1}$] or less when the laser beam passes through the jet liquid as well as having a wavelength range of 200 to 700 nm.

3. The laser machining apparatus according to claim 1, wherein when the jet liquid is water, the liquid supply means includes a treatment apparatus for increasing homogeneity of the jet liquid which serves as a propagation medium for the laser beam.

4. The laser machining apparatus according to claim 1, wherein the laser machining apparatus further comprises an assist gas supply apparatus for introducing an assist gas along the jet liquid column, and
    wherein the assist gas supply apparatus comprises a gas supply chamber disposed downstream of the nozzle and formed to accommodate the jet liquid column, and a guide channel for introducing the assist gas to the gas supply chamber,
    the guide channel being a spiral guide channel formed to spirally flow the assist gas along an outer periphery of the jet liquid column, or a conical guide channel formed to gradually approach an axis of the jet liquid column.

5. The laser machining apparatus according to claim 1, wherein the liquid reservoir chamber has a larger volume than the cavity of the interconnecting channel.

6. The laser machining apparatus according to claim 1, wherein a guide pipe for introducing the jet liquid from the liquid supply means is connected to the distribution channel, and a communicating portion between the interconnecting channel and the distribution channel is arranged at a position deviated from an axis of the guide pipe.

7. The laser machining apparatus according to claim 1, wherein an outer peripheral surface of the interconnecting channel and an outer peripheral surface of the liquid reservoir chamber form a continuous surface without a level difference.

8. The laser machining apparatus according to claim 1, wherein an outer peripheral surface of the interconnecting channel and an outer peripheral surface of the liquid reservoir chamber form a continuous surface without a level difference and an inner peripheral wall surface of the distribution channel and an inner peripheral surface of the interconnecting channel are both formed as an inclined surface that is inclined inward and downstream in the direction of the axis, the inner peripheral surface and the inner peripheral wall surface forming a continuous surface on the same plane.

9. The laser machining apparatus according to claim 1, wherein an outer peripheral surface of the interconnecting channel and an outer peripheral surface of the liquid reservoir chamber form a continuous surface without a level difference and the outer peripheral surface of the interconnecting channel and the outer peripheral surface of the liquid reservoir chamber are both curved inward in an arc-shape.

* * * * *